United States Patent [19]
Tanaka

[11] Patent Number: 5,845,069
[45] Date of Patent: Dec. 1, 1998

[54] CARD-TYPE STORAGE MEDIUM PROTECTING DATA STORED IN ITS MEMORY BY INTERRUPTING AN EXISTING TRANSACTION AFTER A PREDETERMINED PERMISSIBLE NUMBER OF ACCESSES

[75] Inventor: Hiroshi Tanaka, Kawasaki, Japan

[73] Assignee: Fujitsu Limited, Kanagawa, Japan

[21] Appl. No.: 10,994

[22] Filed: Jan. 22, 1998

Related U.S. Application Data

[63] Continuation of Ser. No. 429,475, Apr. 27, 1995, abandoned.

[30] Foreign Application Priority Data

Aug. 1, 1994 [JP] Japan .................................. 6-180156

[51] Int. Cl.$^6$ ..................................................... G06F 13/20
[52] U.S. Cl. .................................. 395/186; 705/18; 902/1
[58] Field of Search .................................. 395/186, 835,
395/821; 705/18, 17, 44; 902/1; 235/379,
381, 380; 380/23, 4; 340/825.34, 825.31

[56] References Cited

U.S. PATENT DOCUMENTS

| | | | |
|---|---|---|---|
| 4,055,746 | 10/1977 | Peterson | 235/380 |
| 4,630,201 | 12/1986 | White | 705/44 |
| 4,727,243 | 2/1988 | Savar | 705/17 |
| 4,839,640 | 6/1989 | Ozer et al. | 340/825.31 |
| 4,882,474 | 11/1989 | Anderl et al. | 235/380 |
| 4,900,904 | 2/1990 | Wright et al. | 235/381 |
| 4,983,816 | 1/1991 | Iijima | 235/379 |
| 5,161,231 | 11/1992 | Iijima | 395/835 |
| 5,204,663 | 4/1993 | Lee | 340/825.34 |
| 5,317,636 | 5/1994 | Vizcaino | 380/23 |
| 5,414,835 | 5/1995 | Iijima | 395/821 |
| 5,557,742 | 9/1996 | Smaha et al. | 395/186 |
| 5,563,946 | 10/1996 | Cooper et al. | 380/4 |
| 5,715,448 | 2/1998 | Suzuki et al. | 707/9 |
| 5,732,245 | 3/1998 | Lee et al. | 711/163 |

FOREIGN PATENT DOCUMENTS

| | | |
|---|---|---|
| 0 262 025 | 3/1988 | European Pat. Off. . |
| 0 330 404 | 8/1989 | European Pat. Off. . |
| 0 416 958 | 3/1991 | European Pat. Off. . |
| 0 566 811 | 10/1993 | European Pat. Off. . |
| 0 614 159 | 9/1994 | European Pat. Off. . |
| 0 617 387 | 9/1994 | European Pat. Off. . |
| 57-168375 | 10/1982 | Japan . |
| WO91/15832 | 10/1991 | WIPO . |

*Primary Examiner*—Le Hien Luu
*Attorney, Agent, or Firm*—Nikaido Marmelstein Murray & Oram LLP

[57] ABSTRACT

An apparatus and method for managing security of an IC card such as a cashless payment card, an ID card, a medical health management card, a local government service card, etc. in each transaction with an object to improve a level of the security. The permissible number of accesses to a data file in each transaction is beforehand set. When a transaction is started between a card-type storage medium and a transaction apparatus, the number of accesses to the data file after the start of the transaction is counted and the counted number of accesses is compared with the permissible number of accesses. If the number of accesses exceeds the permissible number of accesses, it is judged that an error has occurred so as to interrupt the transaction.

32 Claims, 15 Drawing Sheets

FIG. I
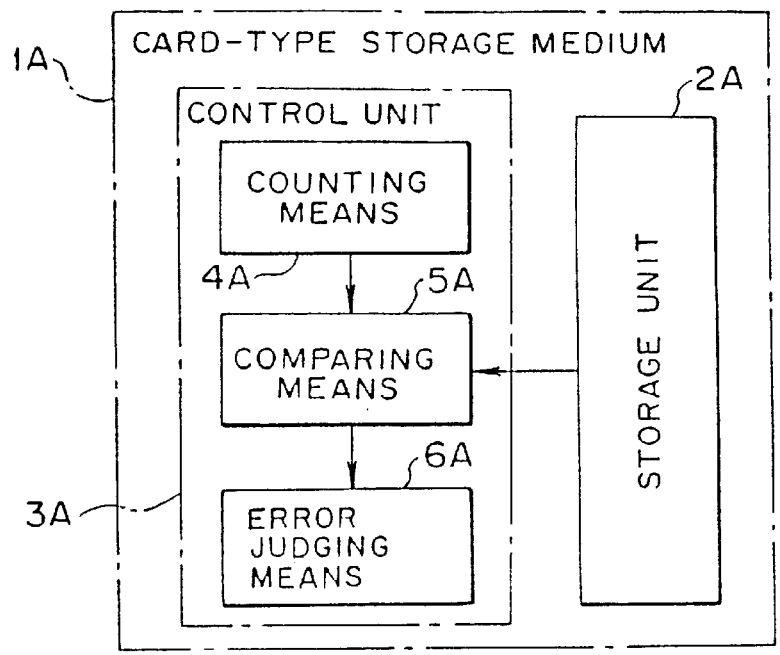
FIG.2
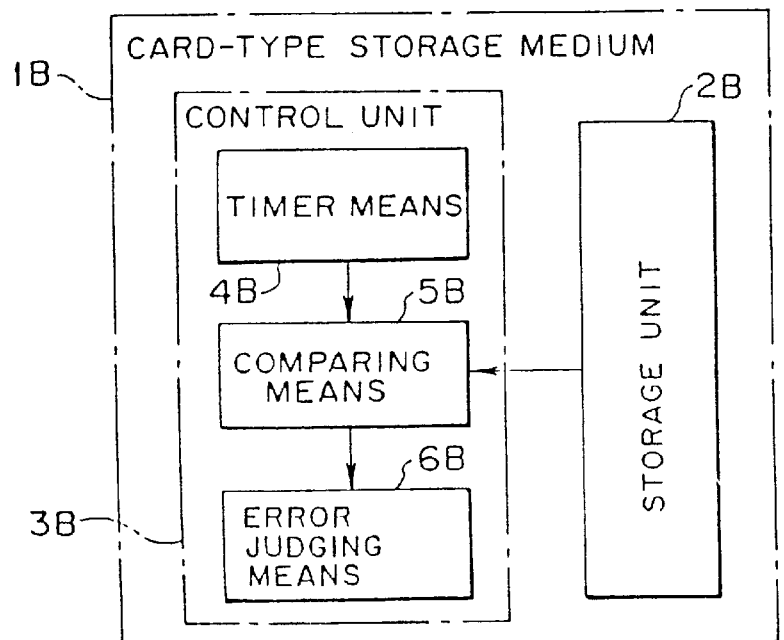

CARD-TYPE STORAGE MEDIUM PROTECTING DATA STORED IN ITS MEMORY BY INTERRUPTING AN EXISTING TRANSACTION AFTER A PREDETERMINED PERMISSIBLE NUMBER OF ACCESSES

This is a continuation application of application Ser. No. 08/429,475 filed on Apr. 27, 1995, now abandoned.

BACKGROUND OF THE INVENTION

1) Field of the Invention

The present invention is applicable to a card-type storage medium such as an IC card used as a cashless payment card, an ID card, a medical health management card, a local government service card, etc. More specifically, the present invention relates to a method for managing and strengthening security at the time of file access to such card-type storage medium, and a card-type storage medium and a transaction apparatus therefore realizing said method.

As represented by forgery of prepayment cards such as telephone cards, crimes of forgery of cards and fabrication of data in cards tend to increase in recent years. Therefore, there is a requirement on a more sophisticated and more complex security function to a system using such card therein.

Particularly, the card-type storage medium such as an IC card, which will spread more widely in the future, keeps therein data more than hundred times those kept in a magnetic card. To prevent leak of information, or forgery or fabrication of the information, consideration on the security of the system using such card-type storage medium is very important.

2) Description of the Related Art

As shown in FIGS. 14 and 15, an IC card (a card-type storage medium) 100 has, in general, a microprocessor unit (MPU) 101 and a storage (file area, for example, an EPROM or an EEPROM) 102, and is connected to a transaction apparatus (an external apparatus) not shown via a terminal unit 103.

The storage 102 has a data area in which data files are kept and a directory area in which control information (pointers, etc.) for the data files in the data area. The MPU 101 manages the data files in the data area in the storage 102 on the basis of the control information in the directory area.

For instance, when receiving an access command from the external transaction apparatus via the terminal unit 103, the MPU 101 performs a reading process (a read access), a writing process (a write access), an erasing process (an erase access), a rewriting process (a rewrite access) or the like, on the storage 102 in response to the access command.

The MPU 101 has a RAM 101B used as a work area upon a control operation along with a ROM 101A keeping a program for the control operation therein. In the case of the IC card 100 of an ISO type, the terminal unit 103 is provided with eight contacts (VCC, RST, CLS, RFU, GND, VPP, I/O and RFU).

In such the IC card 100, the storage 102 keeps data more than 100 times those kept in a magnetic card. To prevent leakage, forgery and fabrication of the data kept in the storage, there are generally set an access capability (a capability for access) and an access right corresponding to the access capability to carry out a security check.

For instance, the storage 102 in the IC card 100 keeps in advance an access capability and an access right as fundamental information for security. The access capability is to verify a capability of a person such as a card issuer, a card holder, an application provider, a service executor, a service provider and the like, who issues a command to the IC card 100. The access right (read right, write right, etc.) is set correspondingly to the above-mentioned access capability for each file kept in the storage 102, which defines an access process that a person having an access capability for each data file can perform.

As shown in FIG. 16, when a data file stored in the storage 102 of the IC card 100 is accessed from the external transaction apparatus (an application A) 110, a select command is issued to select and determine a data file that is an object of the access among the data files stored in the storage 102 in the IC card 100, a verify command is then issued to authenticate an access capability to get an access to that data file. This authentication process is performed on the basis of an authentication code sent from the transaction apparatus 110. After that, when receiving an access command (read record or write record) from the transaction apparatus 110, the IC card 100 verifies whether the access command is of an access type (read, write or the like) which has been permitted beforehand as an access right corresponding to the authenticated access capability.

The security check with the access capability and the access right as stated above will be next described in more detail referring to FIG. 17. Assuming that "OK", "OK", "NG" and "NG" are set to a service provider, a card issuer, a service executor and a card holder, respectively, as a read right (an access right) for a data file stored in a storage 102 of an IC card, as shown in FIG. 17. In other words, the service provider and the card issuer can perform a reading process on that data file.

Under such circumstances where the read right is set, if an application operable with an access capability of the service provider issues a read command (READ) as shown in FIG. 17, the IC card permits the read access to a data file since "OK" is set to the access right in terms of READ of the service provider for that data file in the IC card 100.

On the other hand, when an application operable with an access capability of the service executor issues a read command, the IC card 100 rejects the read access to a data file since "NG" is set to the access right in terms of READ of the service executor for that data file in the IC card 100.

As stated above, the security at the time of access to a data file stored in a conventional IC card (a card-type storage medium) is ensured with two points, that is, the access capability and the access right. However, if information about a relation between the access capability and the access right leaks outside, an unrightful application can easily access to data files in an IC card. For this, there is a requirement to improve a security function upon accessing files in the IC card in order to prevent an access from an unrightful application if the information about the relation between the access capability and the access right leaks outside, or if another person unrightfully obtains the information about the access capability and the access right.

In a typical IC card system, a transaction is done between the IC card and the application in one-by-one correspondence. With an increase of more diversified, sophisticated needs of the users, there appears a system operable in a mode where a plurality of applications can simultaneously use the same one IC card. In such system, the security function attached to the present IC card is insufficient. Such the system requires a security function which can manage applications in an IC card, where simultaneous accesses from a plurality of applications should be taken into consideration.

As described by reference to FIG. 16, in the conventional command process based on an assumption that each command is issued from the same application (the application A in FIG. 16), a security check is made with only the access capability and the access right. It is therefore impossible to specify an application that has issued the command.

In a system in which a plurality of applications are simultaneously accessible to the same one IC card, if, after an application has issued a select command and a verify command to select and determine a data file that is an object of the access and has authenticated the access capacity, a different application B issues an access command to that data file, the IC card 100 accepts the access command from the application B since the IC card 100 mistakenly takes that access command is taken as an access command issued from the same application in the conventional command process. As a result, the application B can get an unrightful access to that data file.

Problems on the security function of the conventional IC card are summarized as follows:

(a) If an unrightful application gets unrightfully security information (an access capability, an access right), the present security function allows an unrightful access to a data file;

(b) In a system in which a plurality of applications are simultaneously accessible to the same one IC card, if, after a data file that is an object of an access has been determined, a different application tries to get an access to that data file, the system allows that unrightful access.

SUMMARY OF THE INVENTION

An object of this invention is to provide a method for managing security for a card-type storage medium, and a card-type storage medium and a transaction apparatus therefor, in which security management in each transaction is realized to improve a level of the security at the time of a file access, and it is possible to specify an application issuing a command so as to prevent accesses to the same one data file from different applications.

This invention therefore provides a method for managing security for a card-type storage medium having a storage unit keeping a data file therein, comprising the steps of setting the permissible number of access in one transaction for said data file, counting the number of accesses to said data file after a start of a transaction when said transaction is started between said card-type storage medium and a transaction apparatus accessing to said card-type storage medium to execute said transaction, comparing the number of accesses counted with said permissible number of accesses set beforehand, judging that an error has occurred if said number of accesses exceeds said permissible number of accesses, and interrupting said transaction.

This invention also provides a method for managing security for a card-type storage medium having a storage unit keeping a data file therein comprising the steps of setting beforehand a permissible access period to said data file in one transaction, measuring an access period to said data file after a start of a transaction when said transaction is started with between said card-type storage medium and a transaction apparatus accessing to said card-type storage medium to execute said transaction therewith, comparing the access period measured with said permissible access period set beforehand, judging that an error has occurred if said access period exceeds said permissible access period, and interrupting said transaction.

This invention also provides a method for managing security for a card-type storage medium having a storage unit keeping data files therein comprising the steps of setting beforehand the permissible number of accesses and a permissible access period for said data file in one transaction, counting the number of accesses and measuring an access period to said data file after a start of a transaction when said transaction is started between said card-type storage medium and a transaction apparatus accessing to said card-type storage medium to execute the transaction, comparing the number of accesses counted with said permissible number of accesses set beforehand and comparing the access period measured with said permissible access period, judging that an error has occurred if said number of accesses exceeds said permissible number of accesses or if said access period exceeds said permissible access period, and interrupting said transaction.

A card-type storage medium according to this invention having a storage unit having a data area keeping a data file therein and a directory area keeping control information about the data file in said data area therein and a control unit managing the data file in said data area in said storage unit on the basis of the control information in said directory area in said storage unit, in which said directory area in said storage unit is set beforehand the permissible number of errors for said data file in one transaction, said control unit comprising a counting means counting the number of accesses to said data file after a start of a transaction when said transaction is started with an external apparatus, a comparing means comparing the number of accesses counted by said counting means with said permissible number of accesses set beforehand in said directory area in said storage unit, and an error judging unit judging that en error has occurred if said number of accesses exceeds said permissible number of accesses as a result of comparison by said comparing means, and interrupting said transaction.

Alternatively, a card-type storage medium according to this invention having a storage unit having a data area keeping a data file therein and a directory area keeping control information about the data file in said data area therein and a control unit managing the data file in said data area in said storage unit on the basis of the control information in said directory area in said storage unit, in which said directory area in said storage unit is beforehand set a permissible access period for said data file in each transaction, said control unit comprising a timer means measuring an access period to said data file after a transaction of a transaction when said transaction is started with an external apparatus, a comparing means comparing the access period measured by said timer means with said permissible access period set beforehand in said directory area in said storage unit, and an error judging means judging that an error has occurred if said access period exceeds said permissible access period as a result of comparison by said comparing means, and interrupting said transaction.

Alternatively, a card-type storage medium according to this invention having a storage unit having a data area keeping a data file therein and a directory area keeping control information about the data file in said data area therein and a control unit managing the data file in said data area in said storage unit on the basis of the control information in said directory area in said storage unit, in which said directory area in said storage unit is beforehand set the permissible number of accesses and a permissible access period for said data file in each transaction, said control unit comprising a counting means counting the number of accesses to said data file after a start of a transaction when said transaction is started with an external apparatus, a timer means measuring an access period to said data file after the start of said transaction, a first comparing means comparing the number of accesses counted by said counting means with said permissible number of accesses set beforehand in said directory area in said storage unit, a second comparing means comparing the access period measured by said timer means with said permissible access period set beforehand in said directory area in said storage unit, and an error judging means judging that an error has occurred f said number of accesses exceeds said permissible number of accesses as a result of comparison by said first comparing means or if said access period exceeds said permissible access period as a result of comparison by said second comparing means, and interrupting said transaction.

In a method for managing security for a card-type storage medium and a card-type storage medium according to this invention, by checking either the number of accesses or an access time in each transaction, if accesses of the number more than necessary have got to the card-type storage medium or if an access for a period longer than necessary is being had to the card-type storage medium, it is possible to interrupt the transaction. This makes it possible to prevent, with certainty, unrightful accesses to the card-type storage medium from the outside and to improve largely a level of the security at the time of a file access.

This invention also provide a method for managing security of a card-type storage medium having a storage unit keeping a data file therein comprising the steps of generating a unique identifier for a transaction in said card-type storage medium when the transaction is started between said card-type storage medium and a transaction apparatus accessing to said card-type storage medium to execute the transaction therewith and the data file that is an object of an access of said transaction apparatus is determined, notifying said unique identifier to aid transaction apparatus, giving said unique identifier to an access command of said transaction apparatus to said card-type storage medium until an end of said transaction, and comparing said unique identifier given to the access command from said transaction apparatus with another unique identifier generated for said transaction in said card-type storage medium, performing a process according to the access command from said transaction apparatus if these unique identifiers are in agreement.

In a card-type storage medium according to this invention having a storage unit having a data area keeping a data file therein and a directory area keeping control information about the data file in said data area therein and a control unit managing the data file in said data area in said storage unit on the basis of the control information in said directory area in said storage unit, in which said control unit comprising a unique identifier generating means generating a unique identifier for a transaction when the transaction is started with an external apparatus and the data file that is an object of an access from said external apparatus is determined, a unique identifier notifying means notifying the unique identifier generated by said unique identifier generating unit to said external apparatus, a first comparing means comparing a unique identifier given to an access command from said external apparatus with the unique identifier generated by said unique identifier generating means for said transaction, and a first judging means judging that the access command from said external apparatus is for said transaction if these unique identifiers are found to be in agreement as a result of comparison by said first comparing means and performing a process according to the access command from said external apparatus.

This invention also provide a transaction apparatus for a card-type storage medium, which accesses to said card-type storage medium having a storage unit keeping a data file therein to execute a transaction therebetween comprising a notifying means notifying an access command given to a unique identifier thereto until an end of a transaction, when the data file that is an object of the access is determined in said card-type storage medium and said transaction apparatus is informed of said unique identifier fro said transaction from said card-type storage medium.

In a method for managing security of a card-type storage medium, a card-type storage medium and a transaction apparatus therefor according to this invention, a unique identifier for a transaction is any time given to an access command issued from a transaction apparatus during said transaction, thereby specifying a transaction apparatus accessing to said card-type storage medium by referring to said unique identifier so as to prevent, with certainty, an access from different applications to the same data file and improve largely a level of the security.

BRIEF DESCRIPTION OF THE DRAWINGS

FIGS. 1 through 4 are block diagrams showing aspects of this invention;

DESCRIPTION OF THE PREFERRED EMBODIMENT

(a) Description of Aspects of the Invention

FIG. 1 is a block diagram showing an aspect of this invention. A card-type storage medium 1A shown in FIG. 1 has a storage unit 2A and a control unit 3A. The storage unit 2A includes a data area in which data files are kept and a directory area in which control information for the data files in the data area is kept. The control unit 3A manages the data files in the data area in the storage unit 2A on the basis of the control information kept in the directory area in the storage unit 2A.

According to this invention, the permissible number of accesses in one transaction for each data file is set beforehand in the directory area in the storage unit 2A. The control unit 3A further has a counting means 4A, a comparing means 5A and an error judging means 6A to make a check on the number of accesses having been gained in each transaction.

When a transaction is started between the card-type storage medium 1A and an external apparatus (a transaction apparatus) not shown, the counting means 4A counts the number of accesses to a data file after the start of the transaction. The comparing means (a first comparing means) 5A compares the number of accesses counted by the counting means 4A with the permissible number of accesses having been set in the directory area in the storage unit 2A. If the number of accesses exceeds the permissible number of accesses as a result of comparison by the comparing means 5A, the error judging means 6A judges that an error has occurred, and interrupts the transaction.

FIG. 2 is a block diagram showing another aspect of this invention. A card-type storage medium 1B shown in FIG. 2 has a storage unit 2B and a control unit 3B; each of which has a function similar to that in FIG. 1. In this aspect, a permissible access period of an access to a data file in one transaction is set beforehand in a directory area in the storage unit 2B. The control unit 3B has a timer means 4B, comparing means 5B and an error judging means 6B to make a check on an access period in each transaction instead of the number of accesses.

When a transaction is started between the card-type storage medium 1B and an external apparatus (a transaction apparatus) not shown, the timer means 4B measures an access period of an access to a data file after the start of the transaction. The comparing means (a second comparing means) 5B compares the access period measured by the timer means 4B with the permissible access period having been set in the directory area in the storage unit 2B. If the access period exceeds the permissible access period, the error judging means 6B judges that an error has occurred, and interrupts the transaction.

Figure 3:
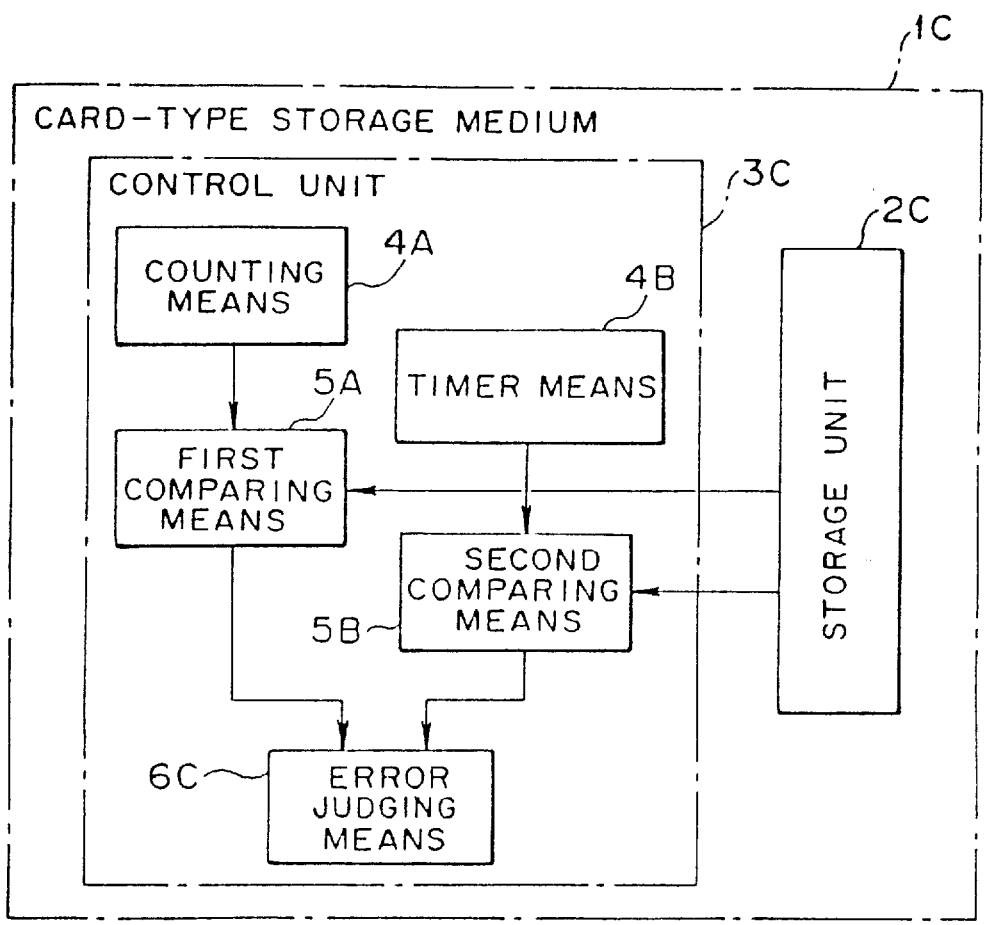

FIG. 3 is a block diagram showing still another aspect of this invention. A card-type storage medium 1C shown in FIG. 3 also has a storage unit 2C and a control unit 3C each of which are similar to that shown in FIG. 1. In this aspect, the permissible number of accesses and a permissible access period in one transaction for each data file are set beforehand in a directory area in the storage unit 2C. The control unit 3C has a counting means 4A, a timer means 4B, a first comparing means 5A and a second comparing means 5B each having a function similar to the above-described. An error judging means 6C is also provided in the control unit 3C to make a check on both of the number of accesses and an access period in each transaction.

If the number of accesses exceeds the permissible number of accesses as a result of comparison by the first comparing means 5A, or if the access period exceeds the permissible access period as a result of comparison by the second comparing means 5B, the error judging means 6C judges that an error has occurred, and interrupts the transaction.

If a plurality of data files are kept in the storage unit 2A or 2C, the permissible number of accesses for each data file may be set beforehand in the directory area in the storage unit 2A or 2C and the timer means 4A may count the number of accesses to each data file. Alternatively, the permissible number of accesses for each type of access to a data file may be set beforehand in the directory area in the storage unit 2A or 2C and the counting means 4A may count the number of accesses for each type of the access.

It is possible to provide an error notifying means in the control units 3A, 3B or 3C to notify an error to the external apparatus if the error judging means 6A, 6B or 6C judges that an error has occurred.

It is also possible to provide in the control unit 3A, 3B or 3C an accumulating means which accumulates the number of errors, an error occurrence number comparing means which compares the number of errors obtained as a result of accumulation by the accumulating means with a permissible number of errors having been set in the directory area in the storage unit 2A, 2B or 2C, and an inactivating means which switches a state of the card-type storage medium into an inactive state if the number of errors exceeds the permissible number of errors as a result of comparison by the error number comparing means. If the number of errors exceeds the permissible number of errors as a result of comparison by the error number comparing means, the error notifying means may notify an error to the external apparatus.

When a transaction is started between the above-mentioned card-type storage medium 1A according to this invention shown in FIG. 1 and a transaction apparatus (an external apparatus), the counting means 4A counts the number of accesses to a data file from the transaction apparatus and the comparing means 5A compares the number of accesses with the permissible number of accesses having been set after the start of the transaction.

If the number of the accesses exceeds the permissible number of accesses as a result of comparison by the comparing means 5A, the error judging means 6A judges that an error has occurred, and the transaction is interrupted. Namely, by making a check on the number of accesses in one transaction, it is possible to interrupt the transaction if it is judged that accesses of the number more than necessary have been got to the card-type storage medium 1A.

In the above-mentioned card-type storage medium 1B according to this invention shown in FIG. 2, a check is made on an access period instead of the number of accesses. When a transaction between the card-type storage medium 1B and a transaction apparatus (an external apparatus) is started, the timer means 4B measures an access period of an access to a data file from the transaction apparatus and the comparing means 5B compares the access period with the permissible access period having been set, after the start of the transaction.

If the access period exceeds the permissible access period as a result of comparison by the comparing means 5B, the error judging means 6B judges that an error has occurred, the transaction is then interrupted. Namely, by making a check on an access period in each transaction, it is possible to interrupt the transaction if it is judged that the transaction is being done with the card-type storage medium 1B for a period longer than necessary.

In the above-mentioned card-type storage medium 1C according to this invention shown in FIG. 3, a check in made on both the number of accesses and an access period. When a transaction is started between the card-type storage medium 1C and a transaction apparatus (an external apparatus), the counting means 4A counts the number of accesses to a data file from the transaction apparatus and the timer means 4B measures a period of access to the data file from the transaction apparatus, after the start of the transaction.

The first comparing means 5A compares the number of accesses with the permissible number of accesses having been set, while the second comparing means 5B compares an access period with the permissible access period having been set. If the number of accesses exceeds the permissible number of accesses as a result of comparison by the first comparing means, or if the access period exceeds the permissible access period as a result of comparison by the second comparing means, the error judging means 6C judges that an error has occurred and interrupts the transaction.

Namely, by checking the number of accesses and an access period in each transaction, either if it is judged that accesses of the number more than necessary have been got to the card-type storage medium 1C, or if it is judged that a transaction for a period longer than necessary is being done with the card-type storage medium 1C, it is possible to interrupt the transaction.

If a plurality of data files are kept in the storage unit 2A or 2C, the permissible number of accesses for each data file is set beforehand and the number of accesses is counted for each data file, thereby checking the number of accesses for each data file. The permissible number of accesses for each type of access is set before hand and the number of accesses is counted for each type of access, thereby checking the number of access for each type of access.

If it is judged that an error has occurred, the error is notified to the transaction apparatus (the external apparatus). As this, it is possible to notify occurrence of error to the transaction apparatus (the external apparatus) which has accessed to the card-type storage medium 1A, 1B or 1C. The transaction apparatus having been informed of the occurrence of error may display an error or perform another process similar to that.

Further, the accumulated number of errors is compared with the permissible number of errors. If the number of errors exceeds the permissible number of errors, the card-type storage medium is inactivated (locked). By checking the number of errors, it becomes possible to inactivate a card-type storage medium in which errors of the excessive number have occurred so as to make the card-type storage medium reject any access from the outside.

By notifying an error to the transaction apparatus (the external apparatus) if the number of errors exceeds the permissible number of errors, it is possible to inform the transaction apparatus (the external apparatus) which have accessed to the card-type storage medium 1A, 1B or 1C of an inactivated state of the card-type storage medium 1A, 1B or 1C so that the transaction apparatus may display an error or perform another process similar to that.

According to the security managing method for a card-type storage medium and the card-type storage medium according to this invention shown in FIGS. 1 through 3, at least either the number of accesses or an access period in each transaction is checked. If accesses of the number more than necessary have been got to the card-type storage medium 1A, 1B or IC, or if a transaction is being done with the card-type storage medium 1A, 1B or 1C for a period longer than necessary, it is possible to interrupt the transaction so that the security at the time of a file access may largely strengthened.

A check on the number of accesses for each data file or for each type of access may realize a security management for each data file or for each type of access.

If the number of error exceeds the permissible number of accesses, the card-type storage medium 1A, 1B or 1C is made inactive. In consequence, it is possible to make the card-type storage medium 1A, 1B or 1C in which errors of the excessive number refuse any access from the outside, thereby improving the security function.

If an error is found by a check on the number of accesses or on an access period, or if the card-type storage medium 1A, 1B or 1C is inactivated, the error is notified to the transaction apparatus. The transaction apparatus which have accessed to the card-type storage medium 1A, 1B or 1C may display an error or perform a process similar to that so as to immediately deal with the error.

Figure 4:
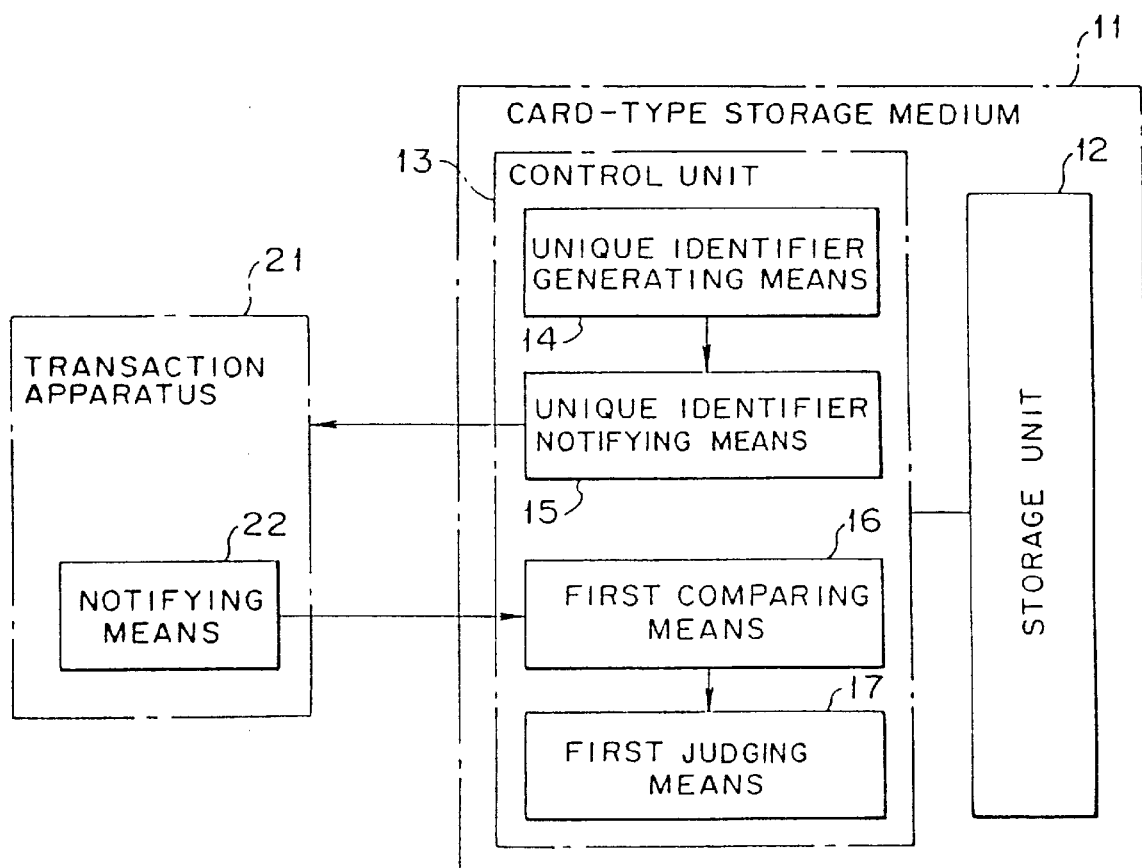

FIG. 4 is a block diagram showing still another aspect of this invention. In FIG. 4, reference numeral 11 denotes a card-type storage medium. The card-type storage medium 11 also has a storage unit 12 and a control unit 13 each having the function similar to that shown in FIG. 1. Reference numeral 21 denotes a transaction apparatus which accesses to the card-type storage medium 11 to do a transaction therewith.

According to this invention, the control unit 13 of the card-type storage medium 11 is provided with a unique identifier generating means 14, a unique identifier notifying means 15, a first comparing means 16 and a first judging means 17.

The unique identifier generating means 14 generates an unique identifier for a transaction when the transaction is started with the transaction apparatus (an external apparatus) and a data file that is an object of an access from the transaction apparatus 21 is determined. The unique identifier notifying means 15 notifies the unique identifier generated by the unique identifier generating means 14 to the transaction apparatus 21.

The first comparing means 16 compares a unique identifier given to an access command issued by the transaction apparatus 21 with the unique identifier generated for this transaction by the unique identifier generating means 14. The first judging means 17 judges that the access command fed from the transaction apparatus 21 is for this transaction if these unique identifiers are found to be in agreement by the first comparing means 16, and performs a process according to the access command from the transaction apparatus.

On the other hand, the transaction apparatus 21 has a notifying means 22. When a data file that is an object of an access is determined in the card-type storage medium 11 and a unique identifier for a transaction is informed from the card-type storage medium 11, the notifying means 22 notifies an access command given a unique identifier thereto to the card-type storage medium 11 until the end of the transaction.

The control unit 13 of the card-type storage medium 11 may also have an enciphering means enciphering a unique identifier generated for a transaction by the unique identifier generating means 14 with the first encipherment key. The unique identifier notifying means 15 may then notify a ciphertext unique identifier obtained by enciphering the unique identifier by the enciphering means to the transaction apparatus 21. In this case, the transaction apparatus 21 has a deciphering means deciphering the ciphertext unique identifier with the first encipherment key.

The unique identifier notifying means 15 may notify a plaintext unique identifier before the encipherment along with the ciphertext unique identifier obtained by enciphering the unique identifier by the enciphering means to the transaction apparatus. In this case, the transaction apparatus 21 has a comparing means which compares a deciphered unique identifier obtained in decipherment by the deciphering means with the plaintext unique identifier supplied from the card-type storage medium 11, and a judging means which judges that the card-type storage medium 11 is rightful if the unique identifiers are found to be in agreement with each other as a result of comparison by the comparing means and proceeds the access process on the card-type storage medium.

The transaction apparatus 21 may further has an enciphering means which enciphers a unique identifier fed from the card-type storage medium 11 with a second encipherment key. The notifying means 22 may give a ciphertext unique identifier obtained by enciphering the unique identifier in the enciphering means to an access command, and notifies it to the card-type storage medium 11. In this case, the control unit 13 of the card-type storage medium 11 has a deciphering means deciphering the ciphertext unique identifier with the second encipherment key. The first comparing means 16 compares a deciphered text unique identifier obtained by deciphering the ciphertext unique identifier with a unique identifier generated for this transaction by the unique identifier generating means.

The notifying means 22 in the transaction apparatus 21 may notify a plaintext unique identifier along with the ciphertext unique identifier obtained by enciphering the unique identifier by the enciphering means to the card-type storage medium 11. In this case, the control unit 13 of the card-type storage medium 11 further has a second comparing means which compares a deciphered text unique identifier obtained in decipherment by the deciphering means with the plaintext unique identifier supplied from the external apparatus, and a second judging means which judges that an access command supplied from the transaction apparatus 21 is rightful if these unique identifiers are found to be in agreement with each other as a result of comparison by the second comparing means, and proceeds the process.

The control unit 13 of the card-type storage medium 11 may further has an error notifying means which notifies an error as a response to an access command from the transaction apparatus 21 if the unique identifiers are found to be in disagreement as a result of comparison by the first comparing means 15 or the second comparing means.

In the above-mentioned card-type storage medium 11 and transaction apparatus 21 according to this invention shown in FIG. 4, when a transaction is started between the card-type storage medium 11 and the transaction apparatus 21 and a data file that is an object of an access from the transaction apparatus 21 is determined, the unique identifier generating means 14 of the card-type storage medium 11 generates a unique identifier for this transaction, and the unique identifier notifying means 15 notifies the unique identifier to the transaction apparatus 21.

The notifying means 22 in the transaction apparatus 21 having informed of that unique identifier notifies an access command in a state where that unique identifier is given thereto to the card-type storage medium until the end of the transaction.

On the side of the card-type storage medium 11, the first comparing means 16 compares the unique identifier given to the access command fed from the transaction apparatus with an unique identifier generated for this transaction. The first judging means 17 judges that the access command from the transaction apparatus 21 is for this transaction if these unique identifiers are found to be in agreement with each other as a result of comparison by the first comparing means 16, and performs a process according to the access command fed from the transaction apparatus 21.

The unique identifier generated when the data file is determined can be known to only the transaction apparatus having performed the data file determining process. In addition, the unique identifier is given to the access command fed from the transaction apparatus 21 any time during one transaction. Accordingly, it is possible to specify the transaction apparatus 21 having accessed to the card-type storage medium 11 by referring to that unique identifier.

The unique identifier is first enciphered with the first encipherment key, the unique identifier notifying means 15 then notifies the ciphertext unique identifier to the transaction apparatus 21. On the side of the transaction apparatus 21, the ciphertext unique identifier fed from the card-type storage medium 11 is deciphered with the first encipherment key. This manner is effective to prevent the unique identifier from leaking as it is while the unique identifier is being informed from the card-type storage medium 11 to the transaction apparatus 21. In addition, it is possible to inhibit an access to the card-type storage medium 11 from another apparatus excepting the transaction apparatus that has the first encipherment key identical to that of the card-type storage medium 11 until the end of the transaction.

The card-type storage medium 11 notifies a plaintext unique identifier before the encipherment along with a ciphertext unique identifier enciphered with the first encipherment key to the transaction apparatus 21. The transaction apparatus 21 deciphers the ciphertext unique identifier fed from the card-type storage medium 11, and compares a deciphered unique identified obtained by deciphering the ciphertext unique identifier with the plaintext unique identifier to judge whether the card-type storage medium 11 having informed the transaction apparatus of the unique identifier is rightful or not. Only if these unique identifiers are in agreement with each other, the transaction apparatus 21 is allowed to proceed an access process on the card-type storage medium 11.

On the side of the transaction apparatus 21, the unique identifier fed from the card-type storage medium 11 is enciphered with the second encipherment key, then a ciphertext unique identifier obtained by enciphering the unique identifier is given to an access command issued from the transaction apparatus 21 to the card-type storage medium 11. On the side of the card-type storage medium 11, the ciphertext unique identifier fed from the transaction apparatus 21 is deciphered with the second encipherment key, and the deciphered text unique identifier obtained by deciphering the ciphertext unique identifier is compared with a unique identifier generated for this transaction. This manner is effective to prevent the unique identifier from leaking as it is while the unique identifier is being notified from the transaction apparatus 21 to the card-type storage medium 11, and to inhibit an access to the card-type storage medium 11 from another apparatus excepting the transaction apparatus 21 that has the second encipherment key identical to that of the card-type storage medium 11.

Next, the transaction apparatus 21 notifies a plaintext unique identifier before the encipherment along with the ciphertext unique identifier having been enciphered with the second encipherment key to the card-type storage medium 11. The card-type storage medium 11 deciphers the ciphertext unique identifier with the second encipherment key, and compares a deciphered text unique identifier obtained in decipherment with the plaintext unique identifier fed from the transaction apparatus 21 to judge whether an access command fed from the transaction apparatus 21 having informed of the unique identifier from the card-type storage medium 11 is rightful or not. Only if these unique identifiers are in agreement with each other, the transaction apparatus 21 is permitted to proceed the access process on the card-type storage medium 11.

At that time, if these unique identifiers are found to be in disagreement as a result of comparison made in the card-type storage medium 11, an error is notified as a response to the access command from the transaction apparatus 21. Accordingly, the transaction apparatus 21 that has accessed to the card-type storage medium 11 may be informed of occurrence of error so as to display an error or perform another process similar to that.

According to the above-mentioned card-type storage medium 11 and the transaction apparatus 21 according to this invention shown in FIG. 4, a unique identifier is given to an access command issued from the transaction apparatus 21 every time in each transaction. By referring to the identifier, it is possible to specify the transaction apparatus 21 that has accessed to the card-type storage medium 11, and to prevent accesses from different applications to one data file with certainty. This may largely improve the level of the security.

In this occasion, by enciphering the unique identifier with the first encipherment key, then notifying the ciphertext unique identifier to the transaction apparatus 21, it is possible to prevent the unique identifier from leaking as it is. It is also possible to inhibit an access to the card-type storage medium 11 from another apparatus excepting the transaction apparatus 21 that has the first encipherment key, thereby further improving the security function.

By notifying the plaintext unique identifier along with the ciphertext unique identifier enciphered with the first encipherment key to the transaction apparatus 21 from the card-type storage medium, and, in the transaction apparatus 21, comparing a plaintext unique identifier obtained in decipherment with the plaintext unique identifier fed from the card-type storage medium 11, it is possible to judge whether the card-type storage medium 11 having notified the unique identifier to the transaction apparatus 21 is rightful or not, thereby further improving the security function.

Further, the transaction apparatus 21 gives the unique identifier enciphered with the second encipherment key to an access command and notifies it to the card-type storage medium 11, it is possible to prevent the unique identifier from leaking as it is, and to inhibit an access to the card-type storage medium 11 from another apparatus excepting the transaction apparatus that has the second encipherment key, thereby further improving the security function.

Moreover, the transaction apparatus 21 notifies the plaintext unique identifier before the encipherment along with the ciphertext unique identifier enciphered with the second encipherment key to the card-type storage medium 11. The card-type storage medium 11 then compares a plaintext unique identifier obtained any decipherment with the plaintext unique identifier fed from the transaction apparatus to judge whether an access command from the transaction apparatus 21 is rightful or not, thereby further improving the security function.

At that time, if these unique identifiers are found to be in disagreement as a result of the comparison in the card-type storage medium 11, an error is notified to the transaction apparatus 21. The transaction apparatus 21 having accessed to the card-type storage medium 11 may display an error or perform another process similar to that so as to immediately deal with the error.

(b) Description of First Embodiment

Figure 5:
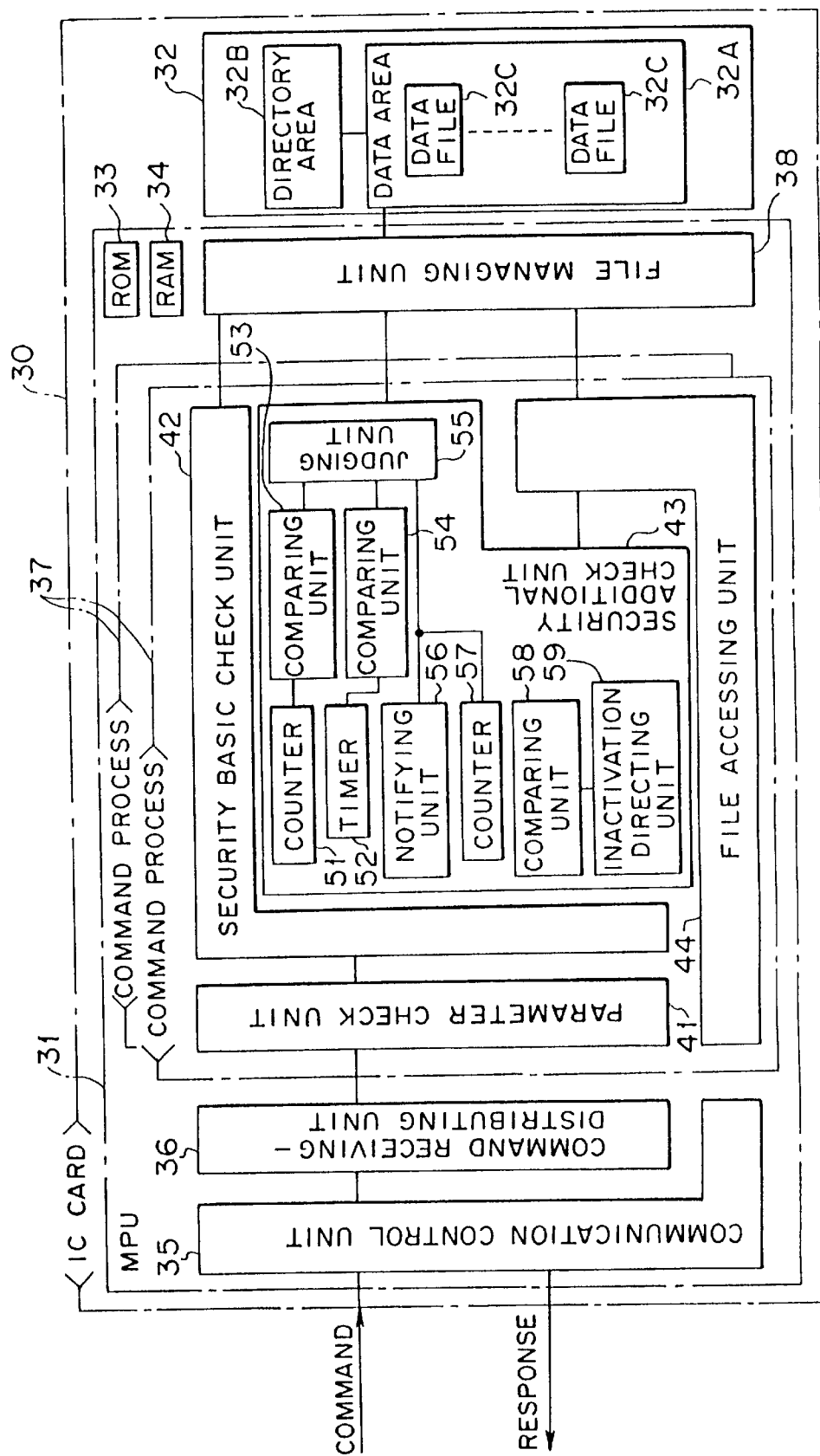
FIG. 5 is a block diagram of a card-type storage medium according to a first embodiment of this invention.
Figure 14:
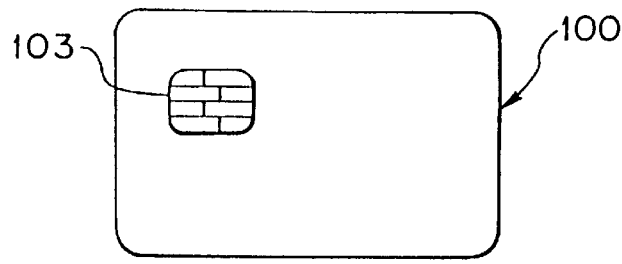
FIG. 14 is a plan view showing an appearance of a typical IC card.
Figure 15:
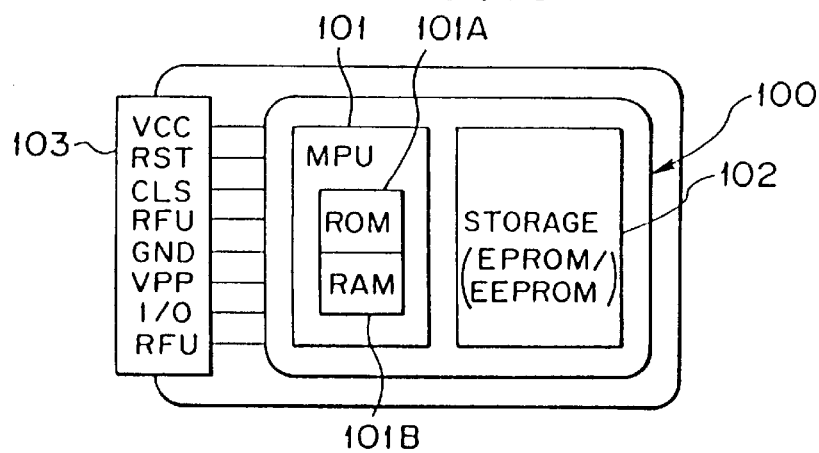
FIG. 15 is a block diagram showing a hardwear structure of a typical IC card.

FIG. 5 is a block diagram of a card-type storage medium according to a first embodiment of this invention. In FIG. 5, reference numeral 30 denotes an IC card (a card-type storage medium). The IC card 30 has a microprocessor unit (MPU) 31 as a control unit and a storage (a file area; an EPROM or an EEPROM, for example) 32 as a storage unit. The IC card 30 is connected to an external apparatus (an upper apparatus, a transaction apparatus or a terminal apparatus) not shown via the terminal unit (not shown in FIG. 5), which has been hereinbefore described by reference to FIGS. 14 and 15.

The storage 32 includes a data area 32A in which a plurality of data files 32C are kept and a directory area 32B in which control information (pointers, security basic information and security additional information which will be described later, etc.) about each of the data files 32C in the data area 32 is kept.

The MPU 31 manages each of the data files 32C in the data area 32A in the storage 32 on the basis of the control information in the directory area 32B. When receiving an access command from the external apparatus, the MPU 31 performs a read process (a read access), a write process (a write access), an erase process (an erase access), a rewrite process (a rewrite access) or the like on the data file 32C according to the access command.

The MPU 31 has a ROM 33 which keeps a program therein to carry out the control operation and a RAM 34 which is used as a work area when the control operation is carried out. The MPU 31 also has another functional elements as shown in FIG. 5, that is, a communication control unit 35, a command receiving-distributing unit 36, a command processing unit 37 and a file managing unit 38.

The communication control unit 35 receives a command (i.e., receives a transmission block) supplied from the external apparatus, and sends a response (i.e., generates and transmits a transmission block) from the IC card 30 to the external apparatus from which the command is supplied.

When the communication control unit 35 receives a command from the external apparatus, the command receiving-distributing unit 36 receives the command and conducts distribution according to the command.

The command processing unit 37 receives the command which has distributed by the command receiving-distributing unit 36 to perform a process according to the command. The structure and operation of the command processing unit 37 will be described in more detail later.

The file managing unit 38 is disposed between the command processing unit 37 and the storage 32, which converts a logical address into a physical address while referring to the directory area 32B so as to function as an interface between the command processing unit 37 and the storage 32.

The command processing unit 37 has elements functioning as a parameter check unit 41, a security basic check unit 42, a security additional check unit 43 and a file accessing unit 44.

The parameter check unit 41 checks various parameters in a command supplied from the external apparatus. The security basic check unit 42 conducts a security basic check on the basis of security basic information in the similar manner to the prior art, as will be described later, if the parameter check unit 41 finds no problem as a result of the check.

If the basic security check unit 42 finds no problem as a result of the check, the security additional check unit 43 conducts a security additional check on the basis of security additional information, as will be described later. If the security additional check unit 43 finds no problem as a result of the check, the file accessing unit 44 accesses to the storage 32 (i.e., a file access block process or a chaining block process) according to the access command supplied from the external apparatus.

Figure 7:
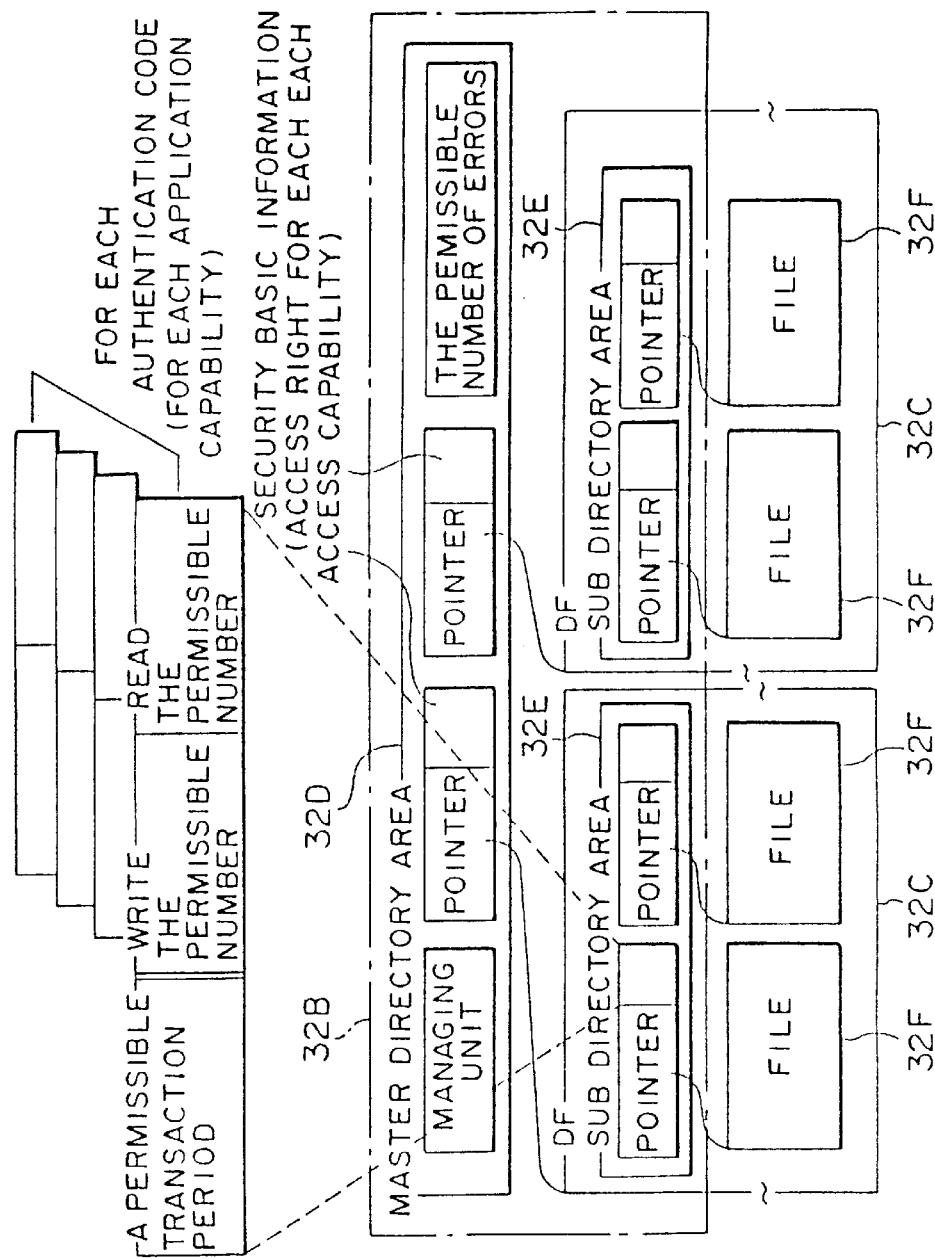
FIG. 7 is an illustration for illustrating a logical structure of a storage unit and security information according to the first embodiment.

Incidentally, a logical structure of the storage 32 according to this embodiment is as shown in FIG. 7. Namely, the directory area 32B further includes a master directory area 32D which manages all the data files 32C, and sub directory areas 32E each provided in each of the data files 32C, each of which manages a plurality of files 32F in the data file 32C.

In the master directory area 32D, there are stored a managing unit which manages the master directory area 32D, pointers each of which shows an address of each of the data files 32C, security basic information (an access right for each access capability) about each of the data files 32C together with the pointer, and the permissible number of errors as security additional information.

In the sub directory area 32E in each of the data files 32C, there are stored pointers each of which shows an address of the file 32F in each of the data files 32C, and security additional information about each of the files 32F together with the pointer.

Figure 6:
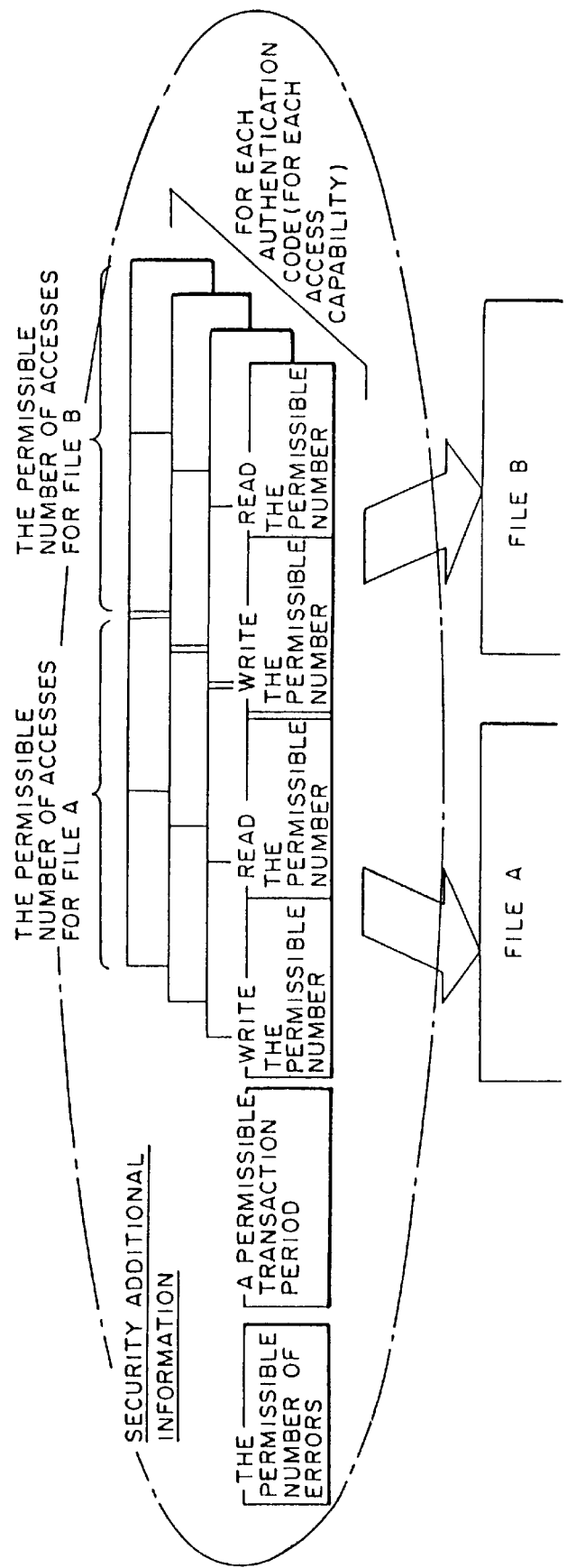
FIG. 6 is an illustration for illustrating security additional information according to the first embodiment.

As the security additional information contained in the sub directory area 32E, there are set the permissible number of accesses and a permissible transaction period. For example, the number of accesses that is considered to occur in one rightful transaction (dealing) is set for each type of access to the file 32F (for example, READ, WRITE, ERASE, REWRITE, etc.) and for each authentication code (an access capability) as the permissible number of accesses, along with a period required to process one rightful transaction as a permissible transaction period (a permissible access period), as shown in FIGS. 6 and 7.

On the other hand, the security basic information in the master directory area 32D is about the access capability and the access right mentioned above. The access capability is to verify a capability of a person such as a card issuer, a card holder, an application provider, a service executor, a service provider, etc. who issues an access command to the IC card 30 from the external apparatus (application). The access right (a read right, a write right, etc.) is set for each of the data files 32C retained in the storage 32 according to the above access capability, which defines an access process that a person having an access capability can perform on each of the data files 32C. Incidentally, there are an erase right, a rewrite right and the like, in addition to the read right and the write right.

Figure 16:
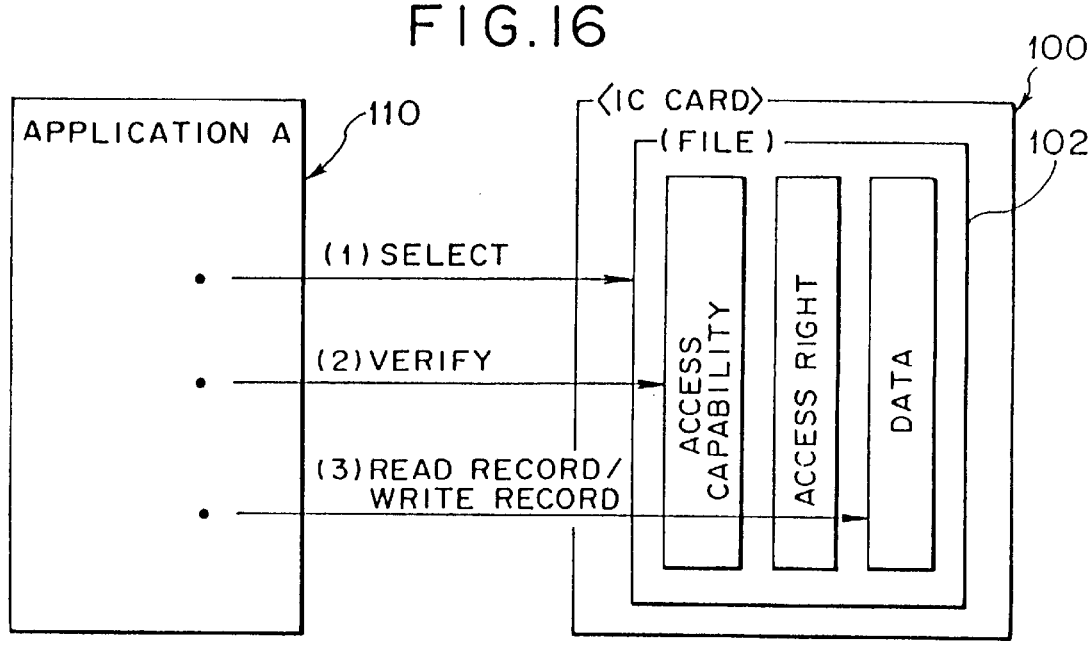
FIG. 16 is an illustration for illustrating a file access procedure to a conventional IC card.
Figure 17:
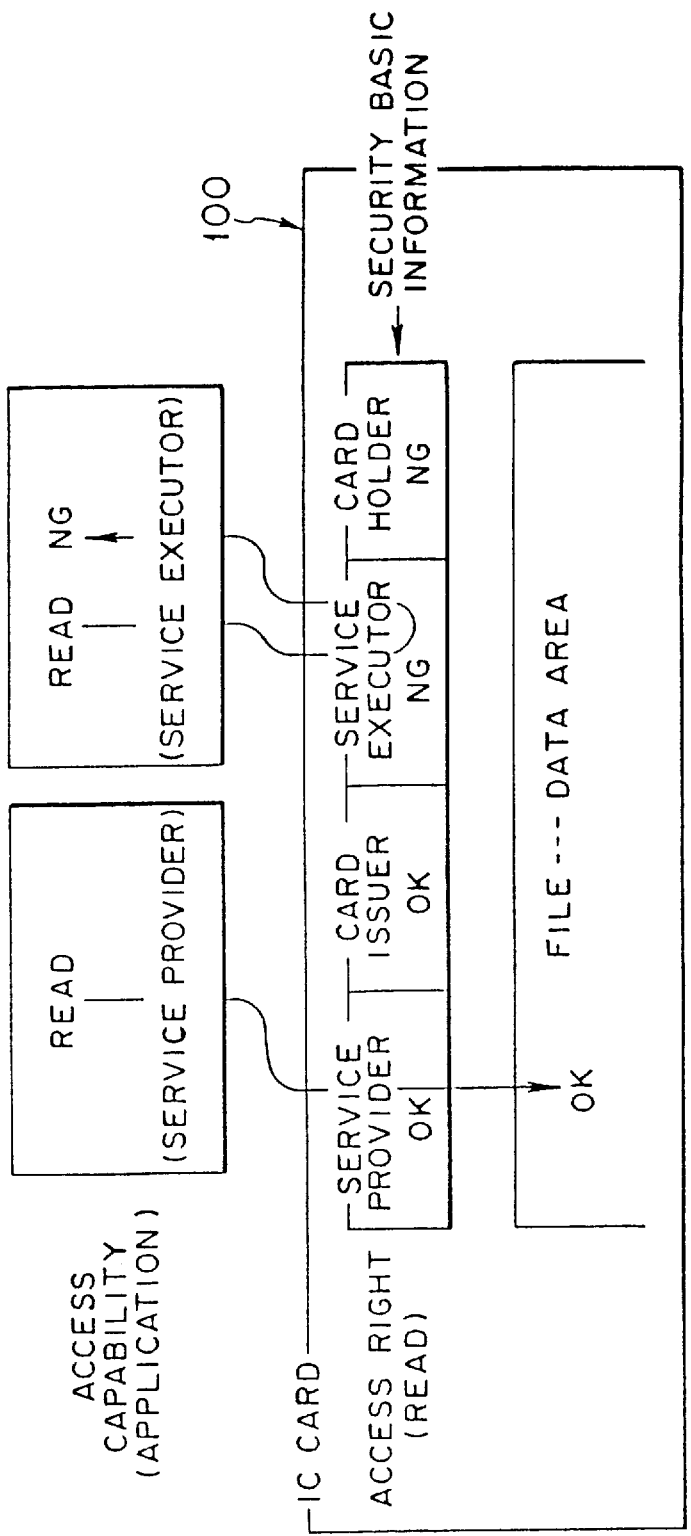
FIG. 17 is an illustration for illustrating a concept of security when a file in a conventional IC card is accessed.
Figure 18:
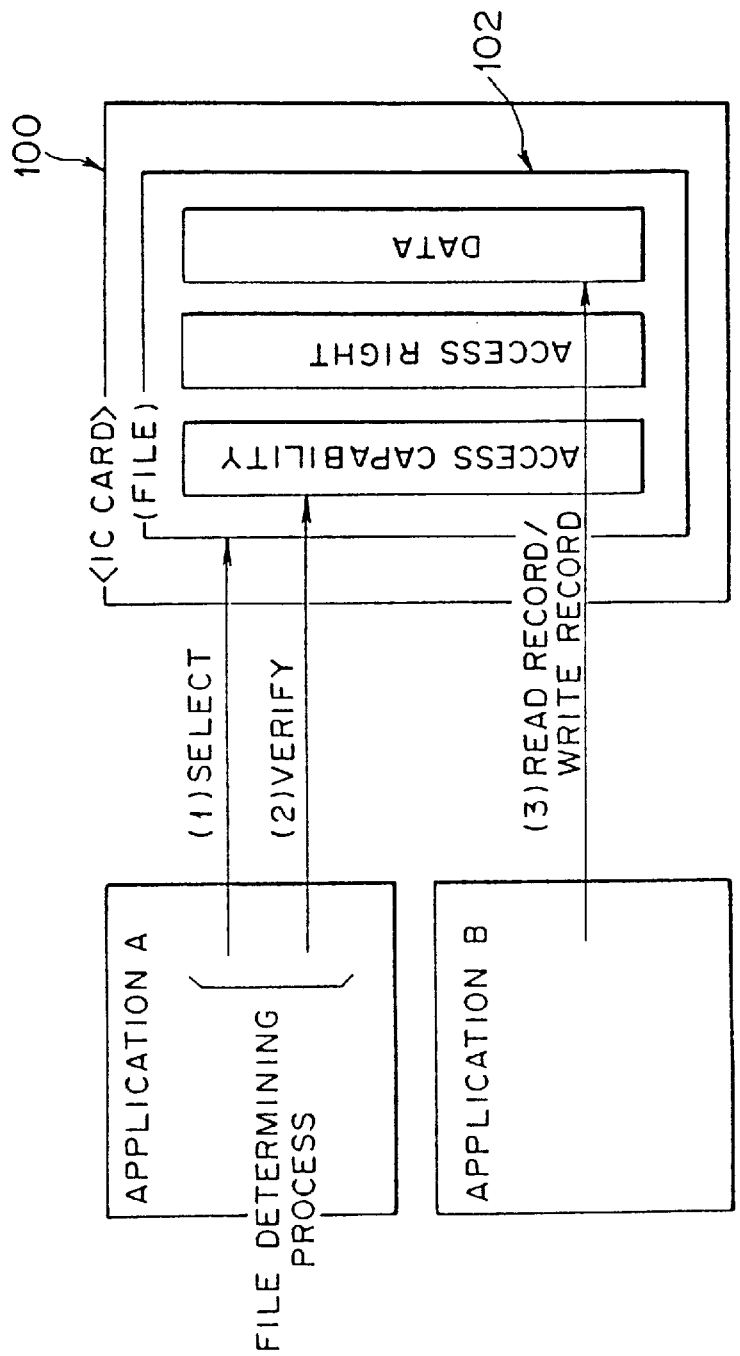
FIG. 18 is an illustration showing an unrightful access that may occur when a file in a conventional IC card is accessed.

When receiving a verify command after selection and determination of a data file 32C (a file 32F) that is an object of an access from the external apparatus (refer to FIG. 16), the security basic check unit 42 authenticates the access capability to get an access to the data file 32C, as same as in the prior art.

When receiving an access command (Read Record, Write Record or the like) after authentication of the access capability, the security basic check unit 42 verifies whether the access command is of a type of access (read, write, etc.) that is permitted as an access right set correspondingly to the authenticated access capability on the basis of the security basic information about that data file 32C in the master directory area 32D.

If the security basic check unit 42 verifies the access command as being permitted as the access right corresponding to the authenticated access capability, the security additional check unit 43 makes a security additional check on the basis of the security additional information about that data file 32C (the file 32E) in the master directory area 32D and the sub directory area 32E.

The security additional check unit 43 according to this embodiment has an access number counter (counting means) 51, a timer (timer means) 52, a first comparing means 53, a second comparing means 54, an error judging unit 55, an error notifying unit 56, an error number accumulative counter (an accumulating means) 57, an error occurrence number comparing unit 58 and an inactivation directing unit (an inactivating means) 59.

When a transaction with the external apparatus is started, the access number counter 51 counts the number of accesses after the start of the transaction for each file 32F that is an object of the access and for each type of access. An area to store a value of the count therein is ensured in the RAM 34 (the work area). The timer 52 measures a period of an access to the data file 32C (the file 32F) after the start of the transaction.

The first comparing unit 53 compares the number of the accesses counted by the access number counter 51 (which is read out from the counted value storing area in the RAM 34) with the permissible number of accesses set beforehand in the sub directory area 32E (which differs depending on the file 32F, the access capability and the type of access). The second comparing unit 54 compares an access period measured by the timer 52 with a permissible access period set beforehand in the sub directory area 32E (which differs depending on the data file 32C).

The error judging unit 55 judges that an error has occurred if the number of accesses exceeds the permissible number of accesses as a result of comparison by the first comparing unit 53, or if an access period exceeds the permissible access period as a result of the comparison by the second comparing unit 54, then interrupts the transaction. The error notifying unit 56 notifies the occurrence of error to the external apparatus, if the error judging unit 55 judges that an error has occurred.

The error number accumulative counter 57 counts up the number of errors if the error judging unit 55 judges that an error has occurred. An area to store a value of the count therein is ensured in the RAM 34 (the work area). The error number comparing unit 58 compares the number of errors counted by the error number accumulative counter 57 (which has been read out from the counted value storing area in the RAM 34) with the permissible number of errors set beforehand in the master directory area 32D.

The inactivation directing unit 59 outputs an inactivation directing signal in order to switch a state of the state of the IC card 30 into an inactive state if the number of errors exceeds the permissible number of errors as a result of the comparison by the error number comparing unit 58.

In order to activate again the IC card 30 that has been inactivated, it is necessary to take a formal procedure. Until completion of the formal procedure, the IC card 30 does not accept any access from the outside. The error notifying unit 56 notifies occurrence of error to the external apparatus if the number of errors exceeds the permissible number of errors as a result of comparison by the error number comparing unit 58.

As stated above, the security additional information, in addition to the security basic information (the access capability, the access right) for each of the data files 32C (the file 32F), and stored in the directory area 32B in the storage 32B, according to this embodiment. The security additional information is calculated as the permissible number of accesses and a permissible transaction period for each of the data files 32C (the file 32F) in a stage of design of the system employing the IC card 30, which security additional information is set in the directory area 32B when the IC card 30 is issued. The security additional information is conditions which are satisfied by only a formal application (a transaction apparatus).

Setting of the security additional information into the IC card 30 is done with a creation command (a create command). By designating parameters, the creation command enables, in general, the data area 32A and the directory area 32B managing the data area 32A to be ensured in the storage 32 in the IC card 30, and the pointer used to get an access to each data file 32C (file 32F) and the security basic information (the access capability, the access right) to be set in the directory area 32B.

According to this embodiment, there are additionally set the permissible number of errors, a permissible transaction period and the permissible number of accesses (Read, Write, etc.) for each authentication code (the access capability) as items (parameters) of the security additional information. This security additional information is additionally set in the directory area 32B.

The creation command according to this embodiment can ensure the area to store the counted values of the access number counter 51 and the error number accumulative counter 57 therein in the RAM 34, and set an initial value '00'h therein. The storing area for the counted values in the RAM 34 may be cleared to the initial value '00'h by a hardware reset when the IC card 30 is inserted in a reader/writer of the external apparatus (the transaction apparatus).

If no security additional information is set in the IC card 30 according to this invention, the check on the number of file accesses or the check on a transaction period for each transaction become NOP (No Operation) so as to make it possible set the security to a level of only the security basic information similarly to the prior art.

Figure 8:
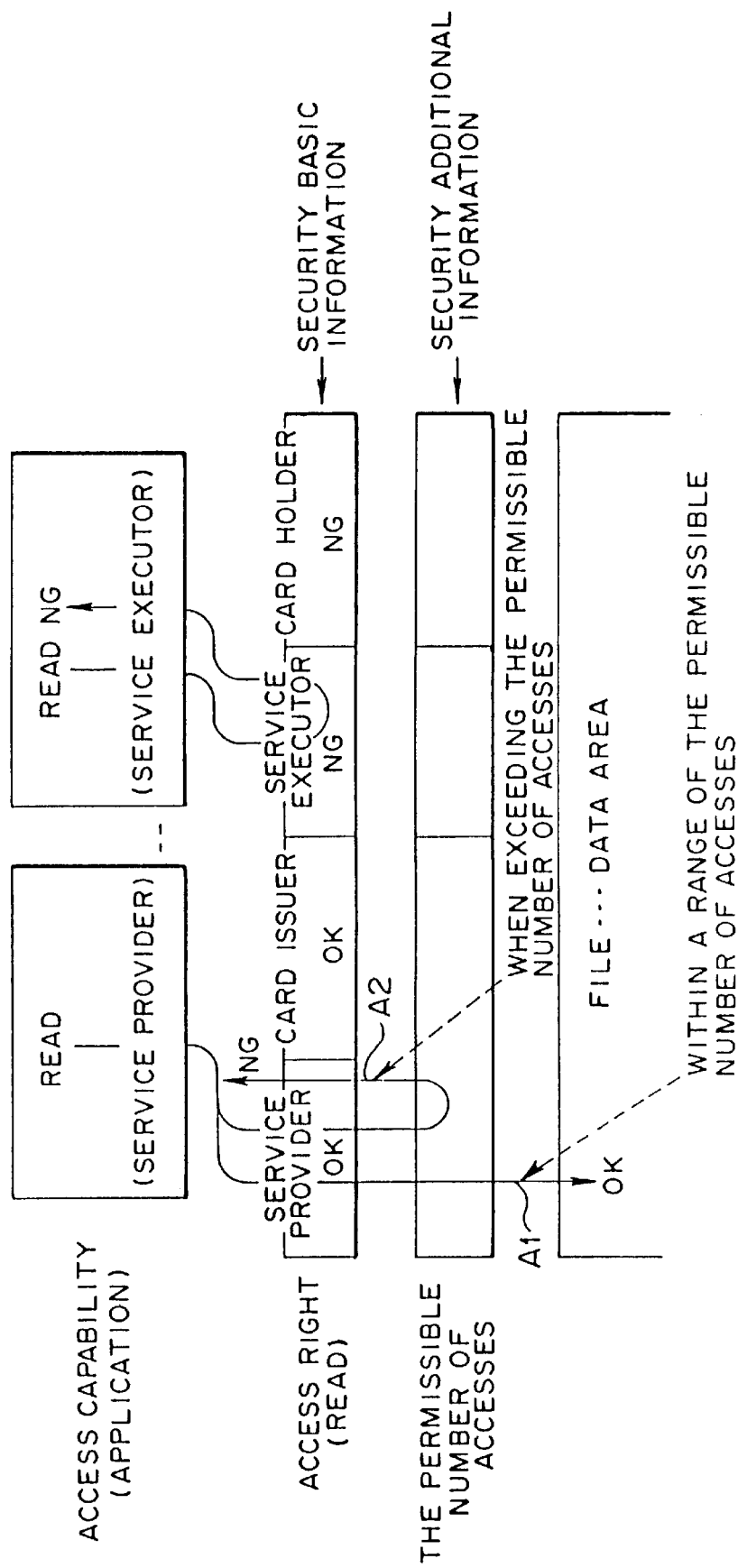
FIG. 8 is an illustration for illustrating an operation of the card-type storage medium according to the first embodiment.

A concept of the security of the IC card 30 with the above structure according to this invention at the time of file access will be described referring to FIG. 8. As shown in FIG. 8, there are set "OK", "OK", "NG" and "NG" to the service provider, the card issuer, the service executor and the card holder, respectively, in the IC card 30 as the read right (the access right) for a file 32F in the storage 32. Namely, the service provider and the card issuer are permitted to perform a read process on that file 32F.

Under such setting condition of the read right, if an application operable in an access capability of the service executor issues a read command, the IC card 30 rejects the read access to that file 32F owing to the function of the security basic check unit 42 since the access right of the service executor to read that file 32F is set as "NG", as shown in FIG. 8.

To the contrary, if an application operable in an access capability of the service provider issues a read command (READ), the IC card 30 judges that file 32F is accessible to be read owing to the function of the security basic check unit 42 since the read right of the service provider to read that data file is set as "OK".

In the prior art, if the security basic check unit 42 judges "OK" as above, a read access to that file 32F is immediately permitted. According to this embodiment, the security additionally check unit 43 checks on the number of accesses and a transaction period as in the next stage.

In FIG. 8, an arrow A1 denotes an example in which the security additionally check unit 43 judges that the conditions set on the basis of the security additional information are satisfied, thus permits a read access to that file 32F. An arrow A2 denotes an example in which the security additional check unit 43 judges that the conditions set on the basis of the security additional information are not satisfied, thus prohibits a read access to that file 32F.

According to this embodiment, if the error judging unit 55 in the security additional check unit 43 judges that this read command arrives within a range of the permissible number of read accesses after the start of the transaction as a result of comparison by the first comparing unit 53 (a result of comparison of a counted value of the access number counter 51 with the permissible number of accesses), the IC card 30 permits a read access to that file 32F.

On the other hand, the read command arrives beyond the range of the permissible number of read accesses from the start of the transaction, the error judging unit 55 judges that an error has occurred so that the IC card 30 interrupts the transaction, makes the error accumulative counter 57 count up a counted value, and performs the following process.

To begin with, the error number comparing unit 58 compares the counted value of the error number accumulative counter 57 with the permissible number of occurrence of error. If the counted value is larger than the permissible number of errors [(the counted value)<(the permissible number of occurrence of error)], the error notifying unit 56 notifies occurrence of error as a response to the command from the external apparatus. If the counted value is equal to or larger than the permissible number of errors [(the counted value)≧(the permissible number of occurrence of error)], the inactivation directing unit 59 outputs an inactivation directing signal to switch the state of the IC card 30 into an inactive state (a card lock state), while the error notifying unit 56 notifies occurrence of error as a response to the command issued from the external apparatus. After the switching to the inactive state, the IC card 30 is unusable so long as the inactive state of the IC card 30 is released in a formal procedure.

If the permissible transaction period is set in the sub directory area 32E in the IC card 30 of this embodiment as the security additional information, the timer 52 is cleared to be activated when the IC card 30 is inserted in the reader/writer (not shown) to reset the hardware.

The second comparing unit 54 in the security additional check unit 43 compares every time a measured value of the timer 52 with the permissible transaction period. If the transaction ends up within a range of the permissible transaction period, the IC card 30 is discharged so that the transaction is terminated normally.

If the measured value of the timer 52 exceeds the transaction permissible period, the error judging unit 55 judges that an error has occurred so as to interrupt the transaction. The error number accumulative counter 57 then counts up a counted value and the IC card 30 performs the same process as in a case where the number of accesses exceeds the permissible number of accesses.

More specifically, if the counted value is smaller than the permissible number of occurrence of errors [(the counted value)<(the permissible number of errors)] as a result of comparison by the error occurrence number comparing unit 58, the error notifying unit 56 notifies only occurrence of error as a response to the command. If the counted value is equal to or larger than the permissible number of errors (the counted value)≧(the permissible number of errors), the inactivation directing unit 59 inactivates the IC card 30 itself (that is, makes the IC card 30 to be in a card lock state), while the error notifying unit 56 notifies occurrence of error. As same as in the above case, the IC card is unusable until a formal procedure is taken to release the inactive state.

According to this embodiment, the security basic check unit 42 makes a check on the basis of the security basic information, next the security additional check unit 43 makes a check according to the conditions set in the directory area 32B as the security additional information, thereby strengthening the security.

If the security additional information is not set in the directory area 32B, only the security basic check unit 42 makes a check on the basis of the security basic information as same as in the prior art.

An operation of the IC card 30 according to this embodiment at the time of file access (that is, an operation to check the number of accesses) will be next described by reference to a flowchart (Steps S1 through S14) shown in FIG. 9.

When the IC card 30 is inserted in an upper apparatus (a reader/writer), the upper apparatus sends a file open instruction to the IC card 30 to judge whether the IC card 30 is in a lock state (an inactive state) or not (Step S1).

If in the lock state (YES decision), the IC card 30 notifies an error to the upper apparatus not so as to start a transaction. If not in the lock state (NO decision), the IC card 30 opens a file that is an object of an access from the upper apparatus (Step S2). In the case where the permissible transaction period is set as the security additional information, the IC card 30 activates the timer 52 by a hardware reset, then notifies a normal start of the transaction to the upper apparatus.

When the file is opened as in the above manner, the upper apparatus notifies an authentication code to the IC card 30. The IC card 30 refers the security basic information [an authentication code (an access capability) for that file] in the storage 32 (Step S3). The security basic check unit 42 then checks the authentication code, in other words, checks on whether the upper apparatus has a capability to get an access to that file (Step S4). If the authentication code is appropriate for that file, the IC card notifies it to the upper apparatus (YES decision), then takes the next step (a file access process). If the authentication code is inappropriate for that file (NO decision), the IC card 30 notifies an error to the upper apparatus, then interrupts the transaction.

If the authentication code is judged to be appropriate for that file as a result of the authentication code check (the access capability check), the IC card 30 is informed of a file access command from the upper apparatus. When receiving the access command, the IC card points a file 32F, which is an object of the access, from the directory area 32B on the basis of the pointer while making a reference to the security basic information about that file 32F (Step S5). The security basic check unit 42 then makes a check on the access right, that is, checks on whether the access command fed from the upper apparatus is of a type of access that is permitted for the access capability of the upper apparatus (Step S6).

If the type of the access command is not permitted for that file (NO decision), the IC card notifies an error to the upper apparatus so as to interrupt the transaction. If the type of the access command is permitted for that file (YES decision), the access number counter 51 counts up a counted value (Step S7).

The IC card 30 then refers to the security additional information (the permissible number of accesses according to the access capability and the access right set for that file) in the storage 30, while referring to a counted value of the access number counter 51 in the RAM 34 (Step S8). The first comparing unit 53 compares the counted value of the access number counter 51 with the permissible number of accesses (Step S9). If the counted value is equal to or smaller than the permissible number of accesses [(the counted value)>(the permissible number of accesses)] as a result of the comparison (YES decision), the file access unit 44 executes an file access according to the access command (Step S14).

If the count value is larger than the permissible number of accesses [(the counted value)>(the permissible number of accesses)] as a result of comparison by the first comparing unit 53, the error judging unit 55 judges occurrence of error so that the IC card 30 interrupts the transaction by that access command, the error number accumulative counter 57 then counts up the counted value (Step S10).

After that, the IC card 30 makes reference to the security additional information (the permissible number of occurrence of error) in the storage 32 and to the counted value of the error number accumulative counter 57 in the RAM 34 (Step S11). The error number comparing unit 58 then compares the counted value of the error number accumulative counter 57 with the permissible number of errors (Step S12). If the counted value is smaller than the permissible number of errors [(the counted value)<(the permissible number of errors)] as a result of the comparison (YES decision), the error notifying unit 56 notifies only an error as a response to the command from the outside.

If the counted value is equal to or larger than the permissible number of errors [(the counted value)≧(the permissible number of occurrence of errors)] as a result of comparison by the error number comparing unit 58 (NO decision), the inactivation directing unit 59 outputs an inactivation directing signal to make the IC card 30 itself be in the inactive state (the card lock state) (Step S12). The error notifying unit 56 then notifies an error as a response to the command from the outside.

Figure 9:
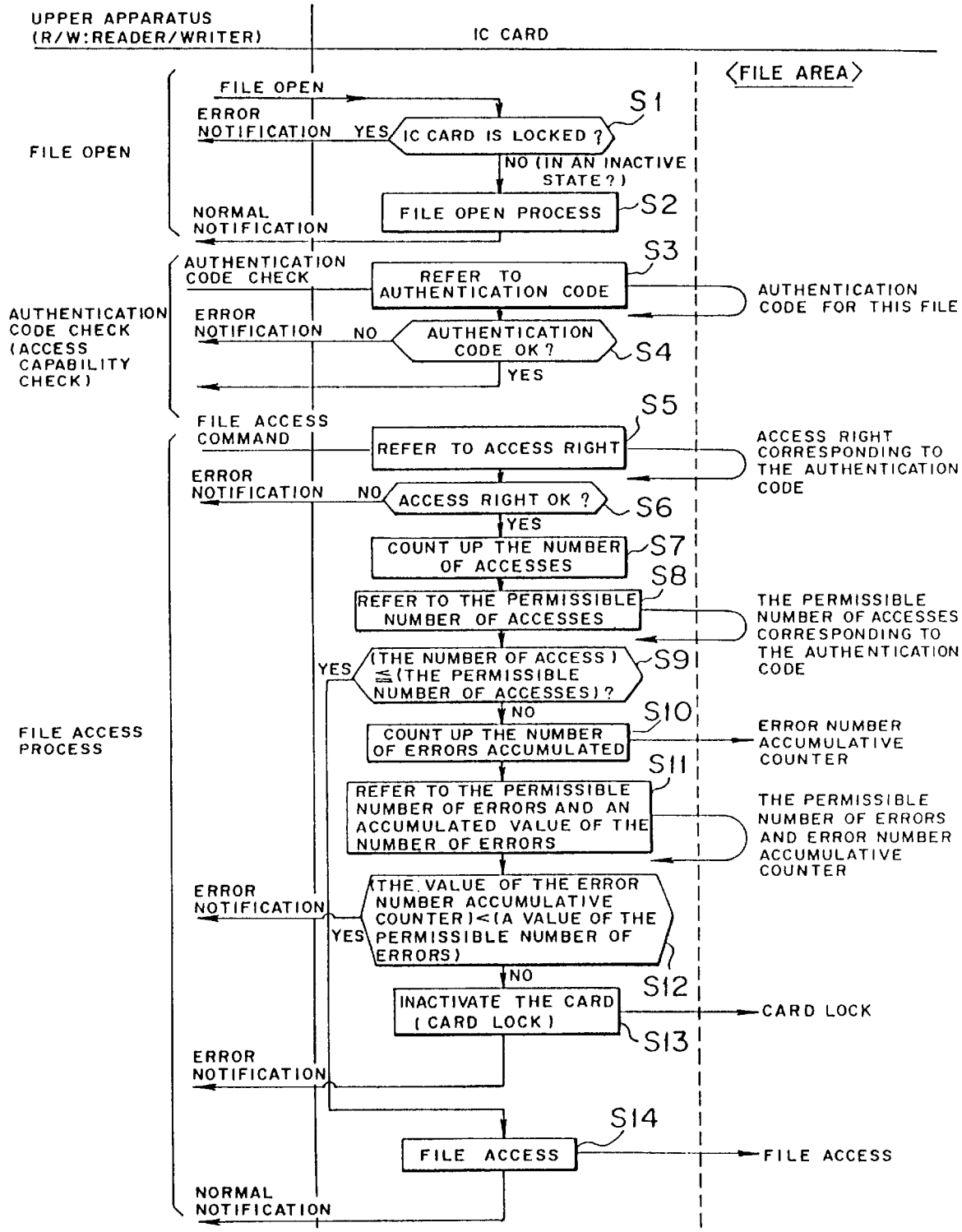
FIG. 9 is a flowchart showing an operation of the card-type storage medium according to the first embodiment.

If the permissible transaction period is set in the sub directory area 32E as the security additional information, though not shown in FIG. 9, the second comparing unit 54 in the security additional check unit 43 concurrently compares the counted value of the timer 52 with the permissible transaction period at any time, as stated above. If the transaction is terminated within a range of the permissible transaction period, the IC card 30 terminates the transaction normally. If the counted value of the timer 52 exceeds the permissible transaction period, the error judging unit 55 judges that an error has occurred at that point so that the IC card 30 interrupts the transaction and performs the above-mentioned process at the Steps S7 through S13.

Figure 10:
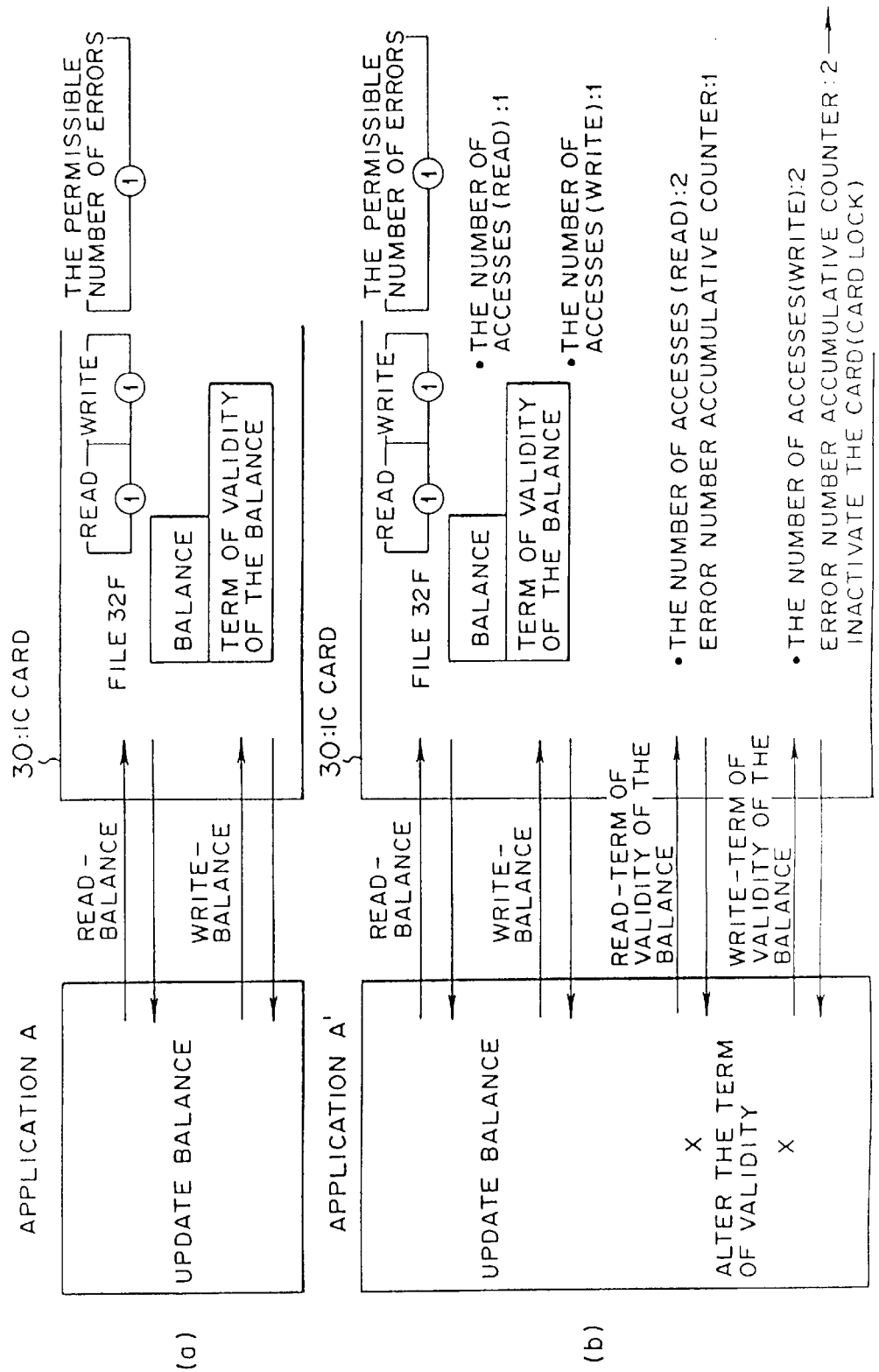
FIGS. 10(A) and 10(B) are illustrations showing a command sequence between the card-type storage medium and an upper apparatus in order to illustrate more concretely the operation of the card-type storage medium according to the first embodiment.

More detailed description will be made by way of a practical example shown in FIGS. 10(A) and 10(B). FIG. 10(A) is a diagram of a command sequence for illustrating an operation of a rightful application where this embodiment is applied. FIG. 10(B) is a diagram of a command sequence for illustrating an operation of an unrightful application where this embodiment is also applied. Here is also description about a check on the number of accesses for each transaction as the security additional information.

As shown in FIGS. 10(A) and 10(B), assuming an application where a balance and a term of validity of the balance are set in the file 32F in the IC card 30, and if the balance is not used within the term of validity, the balance becomes invalid. Assuming also that, one is set to the permissible number of read accesses, to the permissible number of write accesses and to the permissible number of errors as the security additional information.

Here, the upper apparatus operative with a rightful application A performs a process to read the balance from the IC card 30 by a read access command, update the balance and write the balance in the IC card 30 by a write access command. In this case, the process is performed normally since the number of each of the read accesses and the write accesses is one.

On the other hand, the upper apparatus operative with an unrightful application A' trying to updata the term of validity of the balance after update of the balance gains two read accesses and two write accesses in one transaction, as shown in FIG. 10(B). As a result, the number of the accesses exceeds the permissible number of accesses set as the security additional information. In consequence, the accesses of the read and write in relation with the term of validity of the balance become error, the transaction is therefore interrupted so as to be rejected.

The second unrightful writing process (update f the term of validity of the balance) shown in FIG. 10(B) causes the error number accumulative counter to count two so that the counted value exceeds the permissible number of errors. As a result, the IC card 30 becomes the inactive state (the card lock state) at this point. After that, all processes will be rejected. For example, even if a normal application is activated again under such inactive state, the process is incapable.

According to the first embodiment of this invention, the permissible number of accesses set for each of the access capability, the access right and the file is kept as the security additional information together with the conventional security basic information in the directory area 32B managing the data area 32A in the IC card 30 so that it is possible to manage the security by checking the number of accesses to the file with the security additional information in each transaction within the IC card 30.

If information about a relation between the access capability and the access right leaks outside, or if information about the access capability and the access right is unrightfully acquired by another person, it is possible to prevent an access from an unrightful application with certainty and to strengthen greatly the security check at the time of access to the file.

By watching both of the permissible number of accesses and a permissible transaction period, it is possible to interrupt a transaction if accesses of the number more than necessary is got to the IC card 30 during one transaction and if a transaction is done on the IC card 30 for a period longer than necessary. This may further strengthen the security.

Further, if the number of errors exceeds the permissible number of errors during one transaction in the IC card 30, the IC card is made inactive so as to reject all accesses from the outside, thereby still further strengthening the security.

If occurrence of error is found in the various checks, or if the card-type storage medium is inactivated, the upper apparatus (the reader/writer, the transaction apparatus or the terminal apparatus) is informed of an error as a response. The upper apparatus trying an access to the IC card 30 displays an error or performs a process similar to that so as to immediately deal with the error.

An employment of the above-mentioned IC card 30 according to this embodiment to a system including a terminal apparatus having a reader/writer for the IC card, a terminal apparatus connected to an independent reader/writer for the IC card or an upper apparatus (a host) for such the terminal apparatus is helpful to strengthen the security of the entire system.

According to this embodiment, the additional information such as the permissible number of accesses is combined with the security basic information, that is, the security basic information about the access capability and the access right corresponding to that access capability as stated above. This is very helpful to improve a level of the security for the system employing the IC card 30 and to contribute to an improvement of the security of the system where a high-level security is required (a cash card, a credit card, etc.).

According to the above-mentioned first embodiment, both of the permissible number of accesses and a permissible transaction period are set as the security additional information to check concurrently the number of the accesses and a transaction period. It is, however, possible to check either the number of accesses or a transaction period.

(c) Description of Second Embodiment

Figure 11:
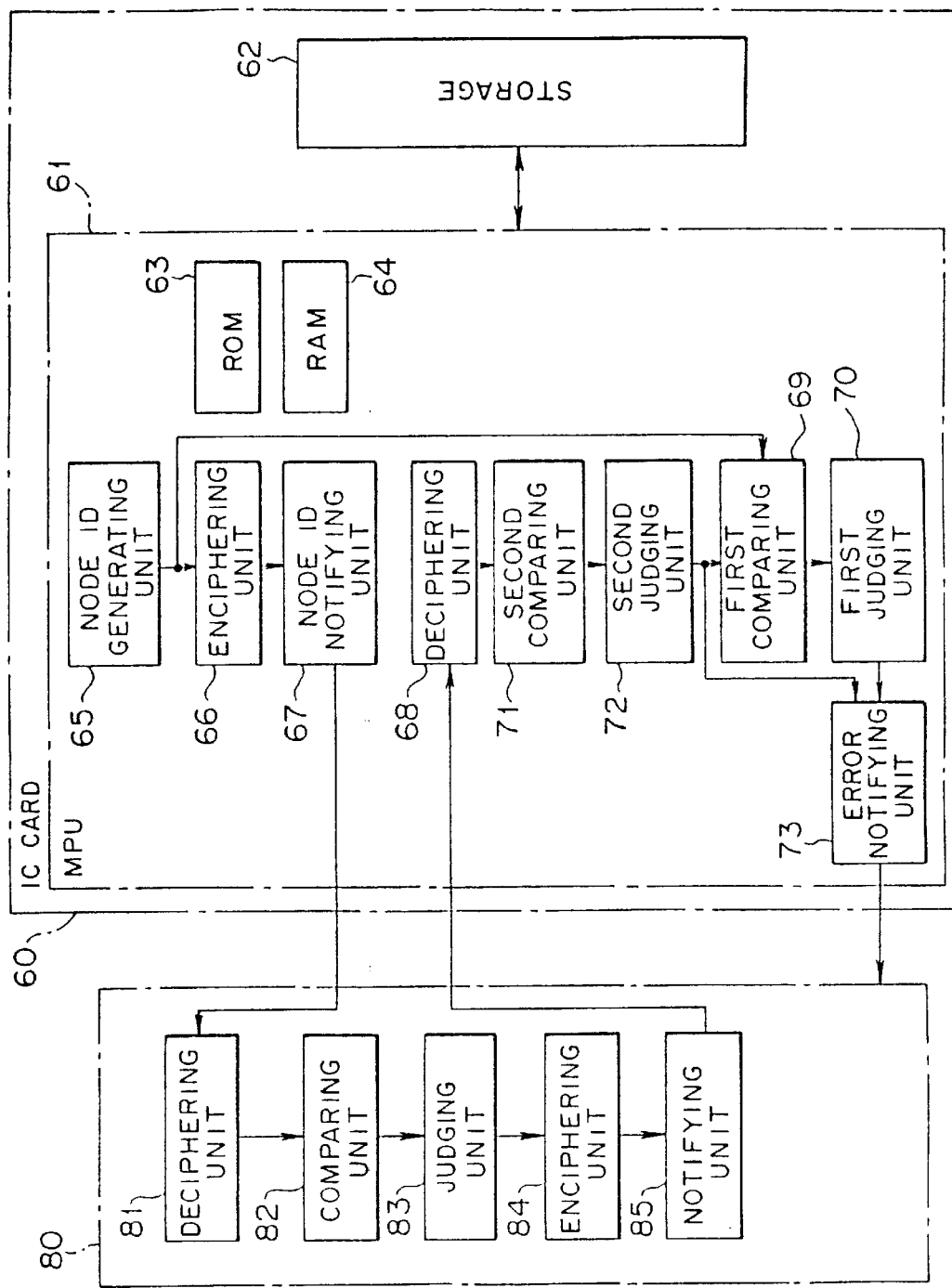
FIG. 11 is a block diagram of a card-type storage medium and a transaction apparatus according to a second embodiment of this invention.

FIG. 11 is a block diagram of a card-type storage medium and a transaction apparatus according to a second embodiment of this invention. In FIG. 11, reference numeral 60 denotes an IC card (a card-type storage medium). The IC card 60 has a microprocessor unit (MPU) 61 as a control unit and a storage (a file area; an EPROM or an EEPROM, for example) 62 as a storage unit. The IC card 60 is connected to a transaction apparatus 80, which has been hereinbefore described by reference to FIGS. 14 and 15, via the terminal unit (not shown in FIG. 11), as same as the IC card 30 according to the first embodiment.

The storage 62 includes a data area in which a plurality of data files 62C are kept and a directory area 62B in which control information about each of the data files 62C in the data area 62A is kept.

The MPU 61 manages each of the data files 62C in the data area 62A in the storage 62 on the basis of the control information in the directory area 62B. The MPU 61 has a function to perform a process according to an access command when receiving the access command from an external apparatus.

The MPU 61 according to this embodiment has a ROM 63 keeping a program therein to carry out a control operation and a RAM 64 used as a work area when the control operation is carried out. The MPU 62 also has another functional elements as shown in FIG. 11, that is, a node ID generating unit (a unique identifier generating means) 65, an enciphering unit 66, a node ID notifying unit (a unique identifier notifying means) 67, a deciphering unit 68, a first comparing unit 69, a first judging unit 70, a second comparing unit 71, a second judging unit 72 and an error notifying unit 73.

When a transaction is started between the IC card 60 and a transaction apparatus (an external apparatus) 80, which will be described later, and a file that is an object of an access from the transaction apparatus is determined, the node ID generating unit 65 generates a node ID (a node identifier; a unique identifier) for this transaction. There is no specific rule to generate the node ID by the node ID generating unit 65. It is, for example, possible to use a function generating pseudo-random numbers or the like (that is, a function generating numbers dynamically and randomly) and use the generated pseudo-random numbers or the like as a node ID.

The enciphering unit 66 enciphers the node ID generated for the transaction by the node ID generating unit 65 with a first encipherment key using an encipherment function.

Hereinafter, a ciphertext will be described as E (a plaintext) and a deciphered text will be described as D (a plaintext), occasionally. Here, "E" is the first letter of a term "encipher" that means enciphering, and "D" is the first letter of a term of "decipher" that means deciphering.

The node ID notifying unit 67 notifies, to the transaction apparatus 80, a ciphertext node ID obtained in encipherment by the enciphering unit 66 as response information when the file is determined along with a plaintext node ID before the encipherment. More specifically, the node IC being notified to the transaction apparatus 80 from the IC card 60 is in a form of "(a plaintext)+E (a plaintext)" in this embodiment.

When informed of a file access command in which a node ID in a form of "(a plaintext)+E (a plaintext)" is given as a parameter from the transaction apparatus 80, the deciphering unit 68 deciphers a ciphertext node ID [E (a plaintext)] with a second encipherment key using an encipherment function to obtain a deciphered text D (a plaintext) of the node ID. The second encipherment key and the encipherment function used in the deciphering unit 68 are identical to a second encipherment key and an encipherment function used to encipher in an enciphering unit 84 in the transaction apparatus 80 if the IC card 60 or the transaction 80, which will be described in detail later, are rightful.

The second comparing unit 71 compares the deciphered text node ID [D (a plaintext) obtained in decipherment by the deciphering unit 68 with the plaintext node ID supplied from the transaction apparatus 80. The second judging unit 72 judges that the access command issued from the transaction apparatus 80 is rightful if the deciphered text ID is in agreement with the plaintext node ID as a result of the comparison by the second comparing unit 71. If the second judging unit 72 judges that the access command issued from the transaction apparatus 80 is rightful, the procedure proceeds to the next step conducted in the first comparing unit 69.

The first comparing unit 69 compares the node ID (either the plaintext node ID or the deciphered text node ID) given to the access command fed from the transaction apparatus 80 with a node ID generated by the node ID generating unit 65 for this transaction. The first judging unit 70 judges that the access command fed from the transaction apparatus 80 is for this transaction if these node IDs are in agreement with each other as a result of comparison by the first comparing unit 69. If the first judging unit 70 judges that the access command fed from the transaction apparatus 80 is for this transaction, the IC card 60 performs a process according to the access command fed from the transaction apparatus 80.

If the node IDs are in disagreement as a result of the comparison by the first comparing unit 69 or the second comparing unit 71, in other words, the first judging unit 70 judges that the access command from the transaction apparatus 80 is not for this transaction, or if the second judging unit 72 judges that the access command fed from the transaction apparatus 80 is unrightful, the error notifying unit 73 notifies an error (an error response) as a response to the access command from the transaction apparatus 80.

Meanwhile, the transaction apparatus 80 according to this embodiment accesses to the IC card 60 to executes a transaction therewith. The transaction apparatus 80 is provided with a deciphering unit 81, a comparing unit 82, a judging unit 83, a ciphering unit 84 and a notifying unit 85.

When informed of a node ID in the form of "(a plaintext) +E (a plaintext)" from the IC card 60 when a transaction with the IC card 60 is started, the deciphering unit 81 deciphers the ciphertext node ID [E (a plaintext)] with a first encipherment key using an encipherment function to obtain a deciphered text D (a plaintext) of the node ID. The first encipherment key and the encipherment function used in the deciphering unit 81 are identical to the first encipherment key and the encipherment function used in encipherment by the ciphering unit 66 in the IC card 60 if this transaction apparatus 80 or the above-mentioned IC card 60 is rightful.

The comparing unit 82 compares the deciphered text node ID (D (a plaintext)] obtained in decipherment by the deciphering unit 81 with a plaintext node ID supplied from the IC card 60.

If the deciphered text node ID is in agreement with the plaintext node ID as a result of the comparison by the comparing unit 82, the judging unit 83 judges that the IC card 60 is rightful to this transaction apparatus 80. If the judging unit 83 judges that the IC card 60 is rightful, the procedure proceeds to the next step conducted in the deciphering unit 84.

The deciphering unit 84 deciphers the node ID (either a plaintext node ID or the deciphered text node ID) fed from the IC card 60 with the second encipherment key using the encipherment function. The second encipherment key and the encipherment function used in the deciphering unit 84 are identical to the second encipherment key and the encipherment function used to decipherment in the deciphering unit 68 in the IC card 60 if this transaction apparatus 80 or the abovementioned IC card 60 is rightful.

The notifying unit 85 notifies an access command in which a node ID in the form of "(a plaintext)+E (a plaintext)" is given as a parameter to the IC card 60 until this transaction with the IC card 60 ends up. The ciphertext node ID [E (a plaintext)] given to the access command by the notifying unit 85 is what has been ciphered by the ciphering unit 84.

An operation at the time of file access in the process of the IC card 60 and the transaction apparatus 80 with the above structures according to this embodiment will be next described by reference to a flowchart (Step S21 through S30) shown in FIG. 12.

When the IC card 60 is inserted to the transaction apparatus 80 (a reader/writer), the transaction apparatus notifies a file open direction and the like to the IC card 60 to make a security check as, for example, described in the first embodiment. If a result of the security check is OK, the transaction apparatus 80 notifies a file determining command to the IC card 60 so that the IC card 60 performs a file determining process (Step S21).

If a file that is an object of an access is determined in compliance to a request from the transaction apparatus 80 to determine the file of the IC card 60, the node ID generating unit 65 in the IC card 60 generates a node ID for this transaction (Step S22).

The node ID generated by the node ID generating unit 65 is retained in the storage 62 in the IC card 60 until the hardware is reset when the IC card 60 is inserted into the transaction apparatus or the like next time. The node ID at the preceding time is erased from the storage 32 so that the node ID may become unique for each transaction.

The node ID generated by the node ID generating unit 65 is notified to the transaction apparatus 80 from the node ID notifying unit 67. At this time, it is possible to notify the node ID in a form of a plaintext or in a form of a ciphertext obtained by ciphering the node ID. It is further possible to notify the node ID in the form of "(a plaintext)+(a ciphertext)" [(a plaintext)+E (a plaintext)] where both of the plaintext node ID and the ciphertext node ID are notified.

Figure 12:
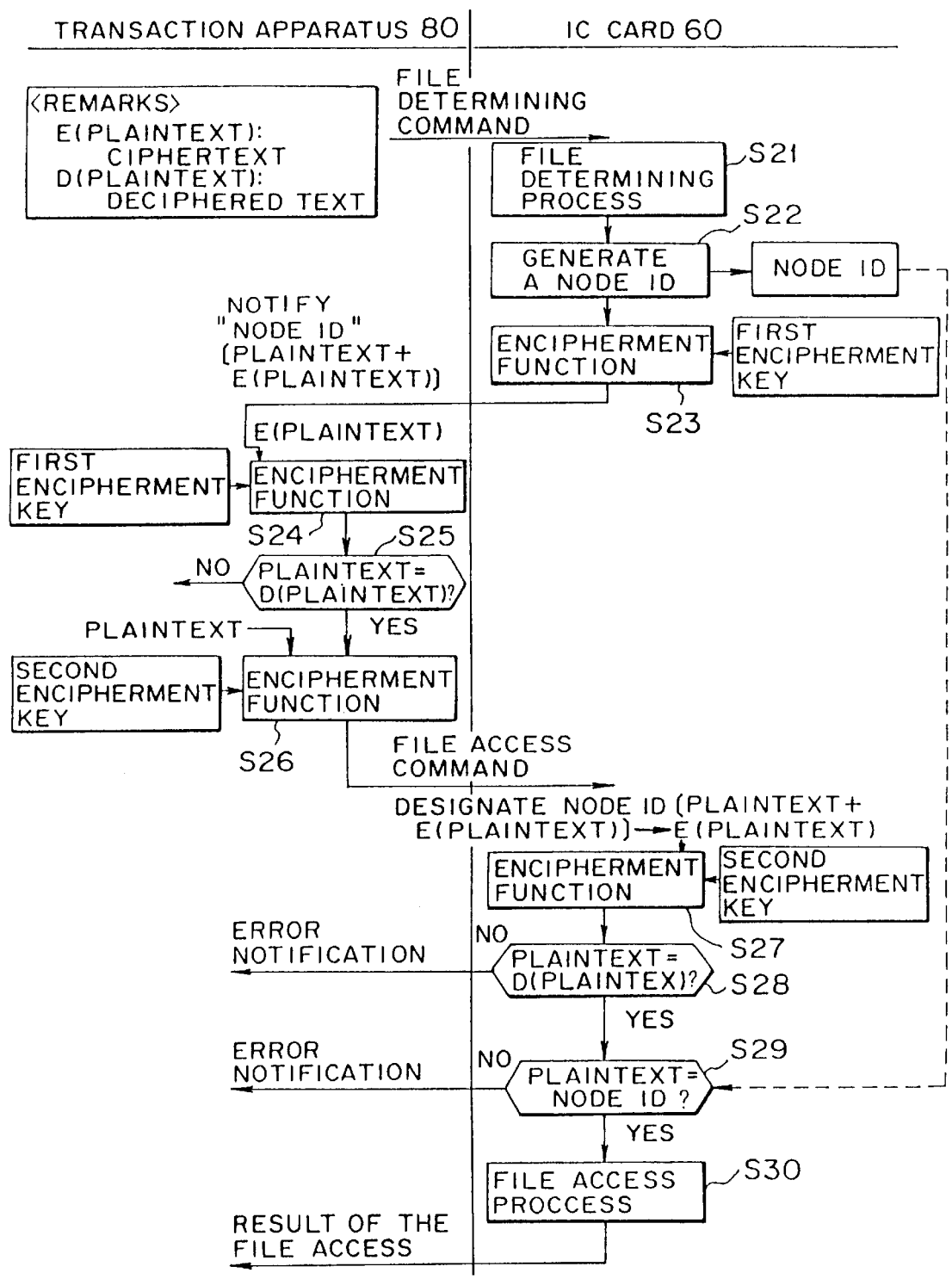
FIG. 12 is a flowchart showing operations of the card-type storage medium and the transaction apparatus according to the second embodiment.
Figure 13:
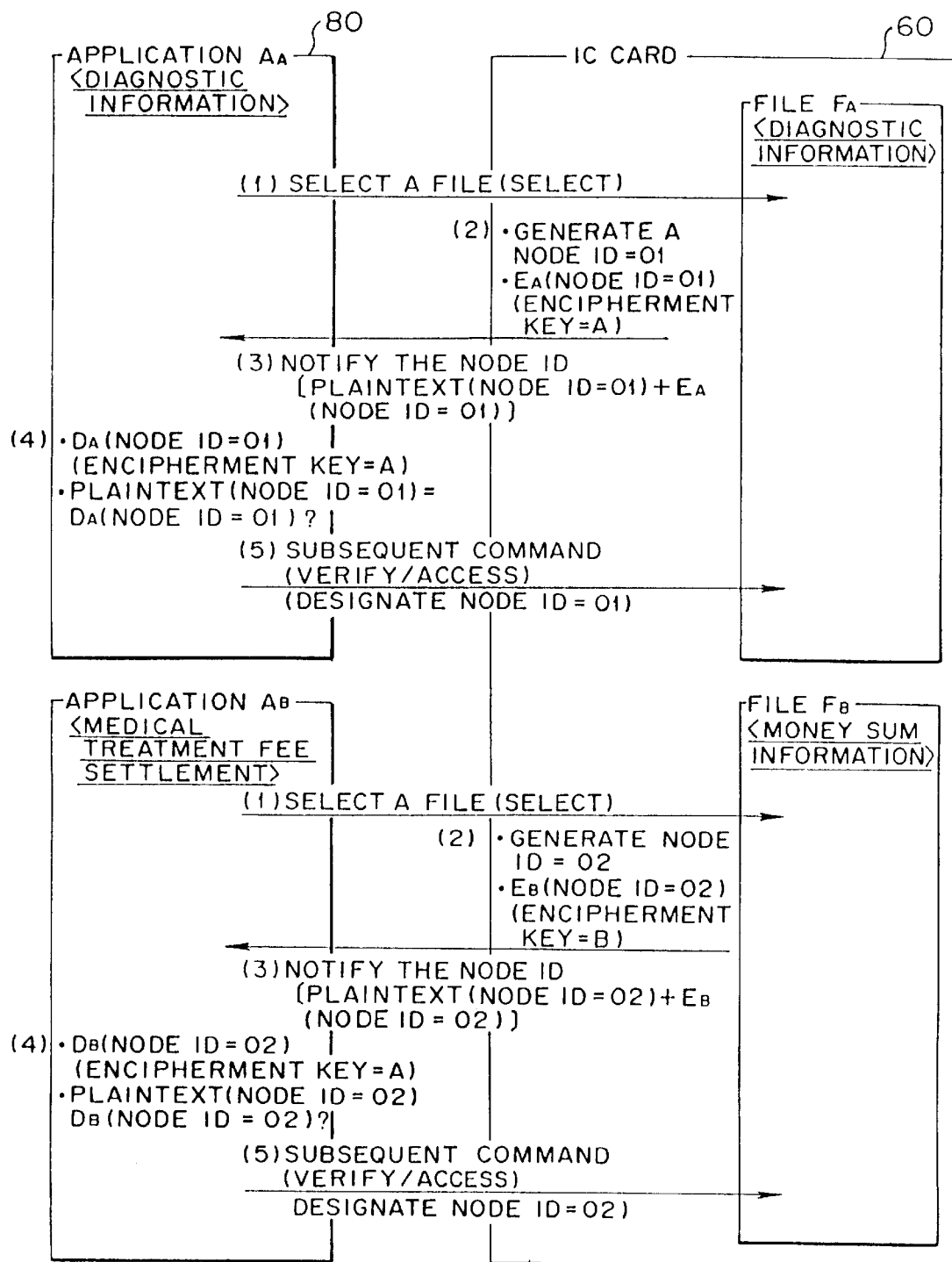
FIG. 13 is an illustration showing signal sequences between the card-type storage medium and the transaction apparatus according to the second embodiment in order to illustrate more concretely the operations of the card-type storage medium and the transaction apparatus.

Referring now to FIG. 12, or FIG. 13 showing an practical example which will be described later, description will be made of a case where the node ID in the form of "(a plaintext)+E (a plaintext), that is, in the last form at the highest-security level, is exchanged between the IC card 60 and the transaction apparatus 80.

According to the second embodiment, as shown in FIG. 12, a node ID generated by the node ID generating unit 65 is enciphered with a first encipherment key using an encipherment function in the enciphering unit 66 (Step S23). The node ID notifying unit 67 then notifies a ciphertext node ID [E (a plaintext)] obtained in the enciphering unit 66 and a plaintext node ID before the encipherment to the transaction apparatus 80.

In the transaction apparatus 80 that has been informed of the node ID, the deciphering unit 81 first deciphers the ciphertext node ID [E (a plaintext)] with a first encipherment key using an encipherment function (Step S24). The comparing unit 82 then compares and collates a deciphered text node ID [D (a plaintext)] obtained in the deciphering unit 81 with the plaintext node ID informed from the IC card 60 (Step S25).

If the deciphered text node ID and the plaintext node ID are in agreement with each other as a result of the comparison, the judging unit 83 judges that the IC card 60 is rightful to the transaction apparatus 80, and the procedure proceeds to the next process.

If the deciphered text node ID and the plaintext node ID are in disagreement, the judging unit 83 judges that data were altered when the IC card 60 notified the node ID to the transaction apparatus 80, or this IC card 60 is not an object of an application of the transaction apparatus 80 since the encipherment key and the encipherment function in the IC card 60 differ from those in the transaction apparatus 80. As a result, the judging unit 83 interrupts the transaction, then discharges the IC card 60.

If the deciphered text node ID coincides with the plaintext node ID, after that, the node ID is enciphered with a second encipherment key using an encipherment function in the enciphering unit 84 when the transaction apparatus 80 issues a file access command to the IC card 60 (Step S26). The notifying unit 85 notifies the ciphertext node ID [E (a plaintext)] obtained by the enciphering unit 84 and the plaintext node ID before the encipherment in a state where they are given as a parameter to the file access command to the IC card 60.

In the IC card 60 informed of the node ID in the form of "(a plaintext)+E (plaintext)" as the parameter for the file access command, the deciphering unit 68 deciphers the ciphertext node ID [E (a plaintext)] with a second encipherment key using an encipherment function (Step S27). The second comparing unit 71 compares and collates the deciphered text node ID [D (a plaintext)] obtained in the deciphering unit 68 with the plaintext node ID informed from the transaction apparatus 80 (Step S28).

If the deciphered text node ID is in agreement with the plaintext node ID as a result of the comparison, the second judging unit 72 judges that the access command from the transaction apparatus 80 is rightful. The first comparing unit 69 then compares and collates the node ID (the deciphered node ID or the plaintext node ID) with a node ID generated by the node ID generating unit 65 for this transaction and kept in the storage 62 (Step S29).

If these node IDs are in agreement with each other as a result of the comparison, the first judging unit 70 judges that the file access command from the transaction apparatus 80 is for this transaction, in other words, the application (the transaction apparatus 80) having issued the file access command is identical to the application having performed the file determining process, defines the application to perform an actual file access process (Step S30), and notifies that result as a response to the transaction apparatus 80.

It is considered that if the node ID designated by the parameter of the file access command is identical to the node ID kept in the IC card 60, the node ID generated in the IC card 60 is known to the application. It is therefore possible to judge that the application trying to get an access to the file is rightful since that node ID can be known to only the application that has performed the file determining process.

If the node IDs are in disagreement as a result of the comparison at the Step S28 (by the second comparing unit 71), the second judging unit 72 judges that any alteration was done on the data when the node ID was notified to the transaction apparatus 80 from the IC card 60, or the IC card 60 is not an object of the application of the transaction apparatus 80 since the encipherment key and the encipherment function in the IC card 60 differ from those in the transaction apparatus 80. The error notifying unit 73 then notifies an error as a response to the access command.

If the node IDs are in disagreement as a result of the comparison at the Step S29 (by the first comparing unit 69), the first judging unit 70 judges that the transaction apparatus 80 (the application) having issued the access command has not performed the file determining process. The error notifying unit 73 then notifies an error as a response to the access command.

As above, the error is informed to the transaction apparatus (the upper apparatus) as a response. The transaction apparatus 80 having tried an access to the IC card 60 interrupts the transaction. After that, the transaction apparatus 80 displays the error, discharges the IC card, etc., or performs a process similar to that so as to immediately deal with that error.

More concrete example will be next described referring to FIG. 13. This example is on the supposition that in a medical institution an application A for writing diagnostic information and another application B for settling a result of the diagnosis try to get accesses simultaneously to the same IC card 60. Namely, a plurality of applications can get accesses simultaneously to the same IC card 60 in this system.

Here, the diagnostic information writing application $A_A$ accesses to a diagnostic information file $F_A$ and a medical treatment fee settling application $A_B$ accesses to a money sum information file $F_B$. The IC card 60 must accept commands from a plurality of applications, so it is necessary for the IC card 60 to accept an access from only an application having performed a determining process on a file that is an object of the access.

When the IC card 60 according to this embodiment receives a file determining command for the diagnostic information file $F_A$ from the diagnostic information writing application $A_A$ [refer to (1) in FIG. 13], the IC card 60 generates a node ID="01" for the command, as stated above. This node ID is not specifically limited to "01" since it is generated randomly. The IC card 60 notifies this node ID to the application A. The node ID="01" is an ID that can be known to only the application $A_A$.

If the IC card 60 enciphers the node ID with a cipher key A common to that of the application $A_A$ (refer to (2) in FIG. 13), and notifies the node ID in the form of "a plaintext+$E_A$ (node ID="01")" [refer to (3) in FIG. 13], only the application can decipher that node ID, whereby the security may be more strengthened.

More specifically, the application $A_A$ having been informed of the node ID in the form of "a plaintext+$E_A$ (node ID="01")" from the IC card 60 judges whether the deciphered node ID [D, (node ID="01")] obtained by deciphering the ciphertext node ID [$E_A$ (node ID="01")] is in agreement with the plaintext node ID or not [refer to (4) in FIG. 13].

If the node IDs are in agreement as a result of the judgement, after that, the IC card 60 accepts an access command from the application $A_A$ by designating this node ID="01" since the access to the file $F_A$ is identical to that of the application having performed the file determination.

The application $A_B$ may become accessible to the file $F_3$ by performing the same process on the file $F_B$ [refer to (1) through (5) in FIG. 13]. In the process between the application $A_B$ and the file $F_3$, there is used, for example, "02" generated randomly as the node ID.

In the above manner, the management of the applications with the node IDs makes it possible to manage accesses to the same application from a plurality of applications.

For instance, if the diagnostic information application $A_A$ tries to get an access unrightfully to the money sum information file $F_B$, the application $A_A$ cannot access to the file $F_B$ since the node ID notified to the application $F_B$ is unknown to the application $A_A$. Accordingly, it is possible to prevent the money sum information or the like in the money sum information file $F_B$ from being operated unrightfully.

According to the second embodiment of this invention, the node ID is generated dynamically in the IC card 60 and notified to the application (the transaction apparatus 80) so as to realize a unique node ID for each transaction. Further, the node ID is enciphered and the encipherment key is held commonly in the IC card 60 and the upper apparatus (the transaction apparatus 80) so as to prevent data tapping when the node ID is notified.

This node ID is what can be known to only the rightful application, so only the rightful application may encipher or decipher this node ID. An unrightful application cannot encipher or decipher this node ID since it is impossible for the unrightful application to get information about the encipherment key and the like.

The management of the applications issuing commands in the above manner makes it possible to specify an application accessing to the IC card 60 so as to strengthen the security. Even in a system in which a plurality of applications operate in parallel, while an application is accessing to a certain file in the IC card to do a transaction therewith, it is possible, with certainty, to prevent an unrightful different application from accessing to that file in the same IC card to do an unfair act thereon.

If occurrence of an error is found in the above various checks, the transaction apparatus 80 is informed of an error as a response. The transaction apparatus 80 having accessed to the IC card 60 may display an error or other process similar to that so as to immediately deal with the error.

Employment of the IC card 60 and the transaction apparatus 80 above-mentioned according to this embodiment to a system including a terminal apparatus incorporated a reader/writer for IC card therein, a terminal apparatus connected to an independent reader/writer for IC card or an upper apparatus having such terminal may improve the security of the entire system.

This embodiment is helpful to ensure sufficient security of a system in which a plurality of applications may access to one IC card 60, and to cope with various needs of the users that may occur in the future.

According to this embodiment, it is possible to enhance the security to a sophisticated level as compared with the convention security system. In the case of an access from a sole application, it is, of course, possible to ensure sufficient security and contribute to an improvement of the security of a system (a cash card, a credit card, etc.) that requires a high-level security.

In the second embodiment described above, the node ID in the form of "(a plaintext)+E (a plaintext)" is exchanged between the IC card 60 and the transaction apparatus 80. It is, however, possible to notify a node ID in the form of a plaintext or a node ID in the form of a ciphertext [only E (a plaintext)].

If a node ID in the form of a plaintext is notified, the enciphering unit 66, deciphering unit 68, the second comparing unit 71, the second judging unit 72, the deciphering unit 81, the comparing unit 82, the judging unit 83 and the deciphering unit 84 shown in FIG. 11 become unnecessary. Further, the Steps S23, S24, S25, S26, S27 and S28 are omitted in FIG. 12.

If a node ID in the form of a ciphertext [only E (a plaintext)] is notified, the second comparing unit 71, the second judging unit 72, the comparing unit 82 and the judging unit 83 in FIG. 11 become unnecessary. Further, the Steps S25 and S28 in FIG. 12 are omitted. In the case where the transaction apparatus 80 gives the ciphertext node ID having been informed from the IC card 60 to the access command as it is, the deciphering unit 81 and the enciphering unit 84 in FIG. 11 become unnecessary. Further, the Steps S24 and S26 in FIG. 12 are omitted. In which case, the deciphering unit 68 in the IC card 60 deciphers the ciphertext node ID with the first encipherment key using the encipherment function.

In the second embodiment described above, the first encipherment key may be identical to the second encipherment key. The first comparing unit 70 in the IC card 60 may compare and collate the node ID with the node ID kept in the IC card 60 by enciphering the node ID in the IC card 60 with the second encipherment key.

The second embodiment may be carried out after the security checks on the basis of the security basic information and the security additional information according to the first embodiment and file determination. In which case, it is possible to more enhance the security function of the IC card.

As having been described the first and second embodiments where the card-type storage medium is an IC card, this invention should not be limited to the above example. If this invention is applied to a card-type storage medium of another type, for example, an optical card, the same functions and effects as the above embodiments are available.

What is claimed is:

1. A method for managing security for a card-type storage medium having a storage unit keeping a data file therein, comprising the steps of:

setting beforehand a permissible number of file accesses in one transaction for said data file;

counting a number of file accesses to said data file after an authentication process and after a start of a transaction when said transaction is started between said card-type storage medium and a transaction apparatus accessing said card-type storage medium to execute said transaction, comparing the number of file accesses counted with said permissible number of file accesses set beforehand, determining that an error has occurred if said number of file accesses exceeds said permissible number of file accesses, and interrupting said transaction.

2. A method for managing security for a card-type storage medium according to claim 1, wherein if a plurality of said data files are kept in said storage, said permissible number of file accesses for each of said data files is set beforehand and the number of file accesses is counted for each of said data files.

3. A method for managing security for a card-type storage medium according to claim 2, wherein said permissible number of accesses for each type of access is set beforehand said data file and the number of file accesses is counted for each type of access.

4. A method for managing security for a card-type storage medium according to claim 3, wherein if it is determined that said error has occurred, said transaction apparatus is informed of said error.

5. A method for managing security for a card-type storage medium according to claim 4, wherein the number of said errors is accumulated, said number of errors accumulated occurred is compared with the permissible number of errors, and said card-type storage medium is inactivated if said number of errors exceeds said permissible number of errors.

6. A method for managing security for a card-type storage medium according to claim 5, wherein if said number of errors exceeds said permissible number of errors, said transaction apparatus is informed of an error.

7. A method of managing security for a card-type storage medium having a storage unit keeping a data file therein comprising the steps of:

setting beforehand a permissible file access period to said data file in one transaction;

measuring a file access period to said data file after an authentication process and after a start of a transaction when said transaction is started between said card-type storage medium and a transaction apparatus accessing said card-type storage medium to execute said transaction therewith, comparing the file access period measured with said permissible file access period set beforehand, determining that an error has occurred if said file access period exceeds said permissible file access period, and interrupting said transaction.

8. A method for managing security for a card-type storage medium according to claim 7, wherein if it is determines that said error has occurred, said transaction apparatus is informed of said error.

9. A method for managing security for a card-type storage medium according to claim 8, wherein the number of said errors is accumulated, said number of errors accumulated is compared with the permissible number of errors, and said card-type storage medium is inactivated if said number of errors exceeds the permissible number of errors.

10. A method for managing security for a card-type storage medium according to claim 9, wherein if said number of errors exceeds said permissible number of errors, said transaction apparatus is informed of an error.

11. A method for managing security for a card-type storage medium having a storage unit keeping a data file therein comprising the steps of:

setting beforehand a permissible number of file accesses and a permissible file access period for said data file in one transaction, counting a number of file accesses and measuring a file access period to said data file after an authentication process and after a start of a transaction when said transaction is started between said card-type storage medium and a transaction apparatus accessing said card-type storage medium to execute the transaction therewith, comparing the number of file accesses counted with said permissible number of file accesses set beforehand and comparing the file access period measured with said permissible file access period, determining that an error has occurred if said number of file accesses exceeds said permissible number of file accesses or if said file access period exceeds said permissible file access period, and interrupting said transaction.

12. A method for managing security for a card-type storage medium according to claim 11, wherein if a plurality of said data files are kept in said storage, said permissible number of file accesses for each of said data files is set beforehand and the number of file accesses is counted for each of said data files.

13. A method for managing security for a card-type storage medium according to claim 12, wherein said permissible number of file accesses for each type of access is set beforehand for said data file and the number of file accesses is counted for each type of access.

14. A method for managing security for a card-type storage medium according to claim 13, wherein if it is determined that an error has occurred, said transaction apparatus is informed of said error.

15. A method for managing security for a card-type storage medium according to claim 14, wherein the number of said errors is accumulated, said number of errors accumulated is compared with the permissible number of errors, and said card-type storage medium is inactivated if said number of errors exceeds said permissible number of errors.

16. A method for managing security for a card-type storage medium according to claim 14, wherein if said number of errors exceeds said permissible number of errors, said transaction apparatus is informed of an error.

17. In a card-type storage medium having a storage unit having a data area keeping a data file therein and a directory area keeping control information about the data file in said data area therein and a control unit managing the data file in said data area in said storage unit on the basis of the control information in said directory area in said storage unit, the improvement comprising:

said directory area in said storage unit being set beforehand with a permissible number of file accesses for said data file in one transaction;

said control unit comprising:

a counting means for counting a number of file accesses to said data file after an authentication process and after a start of a transaction when said transaction is started with an external apparatus;

a comparing means for comparing the number of file accesses counted by said counting means with said permissible number of file accesses set beforehand in said directory area in said storage unit; and an error judging means for determining that an error has occurred if said number of file accesses exceeds said permissible number of file accesses as a result of comparison by said comparing means, and for interrupting said transaction.

18. A card-type storage medium according to claim 17, wherein if a plurality of said data files are kept in said storage unit, said permissible number of file accesses for each of said data files is set beforehand in said directory area in said storage unit, and said counting means counts the number of file accesses for each of said data files.

19. A card-type storage medium according to claim 18, wherein said permissible number of file accesses is set beforehand for each type of access to said data file in said directory area in said storage unit, and said counting means counts the number of file accesses for each type of access.

20. A card-type storage medium according to claim 19, wherein said control unit further comprises an error notifying means notifying an error to said external apparatus if said error judging means determines that an error has occurred.

21. A card-type storage medium according to claim 20, wherein said control unit still further comprises:

an accumulating means for accumulating said number of errors;

an error number comparing means for comparing the number of errors accumulated by said accumulating means with the permissible number of errors set beforehand in said directory area in said storage unit; and an inactivating means for inactivating said card-type storage medium if said number of errors exceeds said permissible number of errors as a result of comparison by said error number comparing means.

22. A card-type storage medium according to claim 21, wherein said error notifying means notifies an error to said external apparatus if said number of errors exceeds said permissible number of errors as a result of comparison by said error number comparing means.

23. In a card-type storage medium having a storage unit having a data area keeping a data file therein and a directory area keeping control information about the data file in said data area therein and a control unit managing the data file in said data area in said storage unit on the basis of the control information in said directory area in said storage unit, the improvement comprising:

said directory area in said storage unit being beforehand set with a permissible file access period for said data file in each transaction;

said control unit comprising:

a timer means for measuring a file access period to said data file after an authentication process and after a start of a transaction when said transaction is started with an external apparatus;

a comparing means for comparing the file access period measured by said timer means with said permissible file access period set beforehand in said directory area in said storage unit; and an error judging means for determining that an error has occurred if said file access period exceeds said permissible file access period as a result of comparison by said comparing means, and for interrupting said transaction.

24. A card-type storage medium according to claim 23, wherein said control unit further comprising an error notifying means for notifying an error to said external apparatus if said error judging means determines that an error has occurred.

25. A card-type storage medium according to claim 24, wherein said control unit still further comprising:

an accumulating means for accumulating said number of errors;

an error number comparing means for comparing the number of errors accumulated by said accumulating means with the permissible number of errors set beforehand in said directory area in said storage unit; and an inactivating means for inactivating said card-type storage medium if said number of errors exceeds said permissible number of errors as a result of comparison by said error number comparing means.

26. A card-type storage medium according to claim 25, wherein said error notifying means notifies an error to said external apparatus if said number of errors exceeds said permissible number of errors as a result of comparison by said error occurrence number comparing means.

27. In a card-type storage medium having a storage unit having a data area keeping a data file therein and a directory area keeping control information about the data file in said data area therein and a control unit managing the data file in said data area in said storage unit on the basis of the control information in said directory area in said storage unit, the improvement comprising:

said directory area in said storage unit being beforehand set with a permissible number of file accesses and a permissible file access period for said data file in one transaction;

said control unit comprising:

a counting means for counting a number of file accesses to said data file after an authentication process and after a start of a transaction when said transaction is started with an external apparatus;

a timer means for measuring a file access period to said data file after the authentication process and after the start of said transaction;

a first comparing means for comparing the number of file accesses counted by said counting means with said permissible number of file accesses set beforehand in said directory area in said storage unit;

a second comparing means for comparing the file access period measured by said timer means with said permissible file access period set beforehand in said directory area in said storage unit; and an error judging means for determining that an error has occurred if said number of file accesses exceeds said permissible number of file accesses as a result of comparison by said first comparing means or if said file access period exceeds said permissible file access period as a result of comparison by said second comparing means, and for interrupting said transaction.

28. A card-type storage medium according to claim 27, wherein if a plurality of said data files are kept in said storage unit, said permissible number of file accesses for each of the data files is set beforehand in said directory area in said storage unit, and said counting means counts the number of file accesses for each of the data files.

29. A card-type storage medium according to claim 28, wherein said permissible number of accesses to said data file for each type of access is set beforehand in said directory in said storage unit, and said counting means counts the number of accesses for each type of access.

30. A card-type storage medium according to claim 29, wherein said control unit further comprising an error notifying means for notifying an error to said external apparatus if said error determines that an error has occurred.

31. A card-type storage medium according to claim 30, wherein said control unit still further comprising:
- an accumulating means for accumulating said number of errors;
- an error number comparing means for comparing the number of errors accumulated by said accumulating means with the permissible number of errors set beforehand in said directory area in said storage unit; and
- an inactivating means for inactivating said card-type storage medium if said number of errors exceeds said permissible number of errors as a result of comparison by said error number comparing means.

32. A card-type storage medium according to claim 31, wherein said error notifying means notifies an error to said external apparatus if said number of errors exceeds said permissible number of errors as a result of comparison by said error number comparing means.

* * * * *